(12) United States Patent
Taylor et al.

(10) Patent No.: US 10,417,729 B2
(45) Date of Patent: Sep. 17, 2019

(54) GRAPHICS HARDWARE BOTTLENECK IDENTIFICATION AND EVENT PRIORITIZATION

(71) Applicant: INTEL CORPORATION, Santa Clara, CA (US)

(72) Inventors: Robert B. Taylor, Hillsboro, OR (US); Pankaj Sharma, Santa Clara, CA (US); Daniel H. Walsh, Portland, OR (US); Matthew B. Callaway, Shingle Springs, CA (US)

(73) Assignee: INTEL CORPORATION, Santa Clara, CA (US)

( * ) Notice: Subject to any disclaimer, the term of this patent is extended or adjusted under 35 U.S.C. 154(b) by 385 days.

(21) Appl. No.: 15/043,018

(22) Filed: Feb. 12, 2016

(65) Prior Publication Data
US 2017/0236241 A1   Aug. 17, 2017

(51) Int. Cl.
*G06T 1/20* (2006.01)
*G06F 9/54* (2006.01)

(52) U.S. Cl.
CPC ........... *G06T 1/20* (2013.01); *G06F 9/542* (2013.01)

(58) Field of Classification Search
CPC .................. G06T 1/20; G06F 9/452
See application file for complete search history.

(56) References Cited

U.S. PATENT DOCUMENTS

| | | | | |
|---|---|---|---|---|
| 8,402,449 B1* | 3/2013 | Biswas | .................. | G06F 8/441 717/106 |
| 9,256,971 B1* | 2/2016 | Nehring | ................ | G06T 11/206 |
| 9,788,018 B2* | 10/2017 | Wu | ....................... | H04N 19/895 |
| 2006/0274070 A1* | 12/2006 | Herman | .................. | A63F 13/10 345/474 |
| 2007/0018980 A1* | 1/2007 | Berteig | .................. | G06T 15/80 345/426 |
| 2009/0164812 A1* | 6/2009 | Capps, Jr. | ............. | G06F 1/3203 713/320 |
| 2011/0321051 A1* | 12/2011 | Rastogi | ................. | G06F 9/4881 718/102 |
| 2013/0063472 A1* | 3/2013 | Marison | ................ | G06T 15/005 345/591 |

* cited by examiner

*Primary Examiner* — Maurice L. McDowell, Jr.
*Assistant Examiner* — Donna J. Ricks

(57) ABSTRACT

Techniques to sort events of a graphics workload executed by a graphics processing unit to provide identification of events, that if addressed, may result in an improvement in performance are disclosed. The techniques can include: generating a signature and a weight for each event of a graphics workload; generating an event priority tree by organizing the events into parent and leaf nodes, where parent nodes comprise leaf nodes having a shared hash; and sorting frames based on a global weight of events corresponding to the frames.

23 Claims, 20 Drawing Sheets

SIGNATURE TABLE - 1500

| [Event 1510-1] | [Signature 1520-1] | [Hashes 1530-1 \| VS HASH \| HS HASH \| DS HASH \| PS HASH \| CS HASH] | [Weight 1540-1] |
|---|---|---|---|
| 1 | 0x186521000000 | 0x4142F6C8                    0x3223EF42 | 6.34 |

| [Event 1510-2] | [Signature 1520-2] | [Hashes 1530-2 \| VS HASH \| HS HASH \| DS HASH \| PS HASH \| CS HASH] | [Weight 1540-2] |
|---|---|---|---|
| 2 | 0x1822101C000 | 0x9210FB1B                    0x12186BA8 | 17.99 |

| [Event 1510-3] | [Signature 1520-3] | [Hashes 1530-3 \| VS HASH \| HS HASH \| DS HASH \| PS HASH \| CS HASH] | [Weight 1540-3] |
|---|---|---|---|
| 3 | 0x623000600 | 0x4152BA67                    0x3223EF42 | 1.56 |

| [Event 1510-4] | [Signature 1520-4] | [Hashes 1530-4 \| VS HASH \| HS HASH \| DS HASH \| PS HASH \| CS HASH] | [Weight 1540-4] |
|---|---|---|---|
| 4 | 0x2100020000 | 0xAB86CBE6                    0x13292C54 | 5.72 |

| [Event 1510-5] | [Signature 1520-5] | [Hashes 1530-5 \| VS HASH \| HS HASH \| DS HASH \| PS HASH \| CS HASH] | [Weight 1540-5] |
|---|---|---|---|
| 5 | 0x1822105C000 | 0x4142F6C8                    0x3223EF42 | 0.51 |

FIG. 9A GRAPHICS PROCESSOR COMMAND FORMAT
900
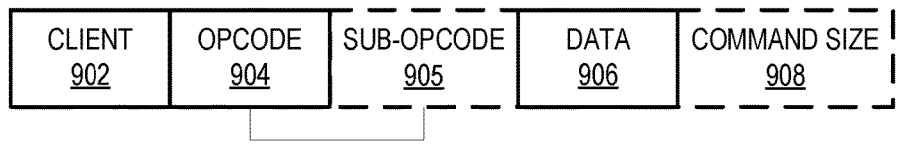
FIG. 9B GRAPHICS PROCESSOR COMMAND SEQUENCE
910
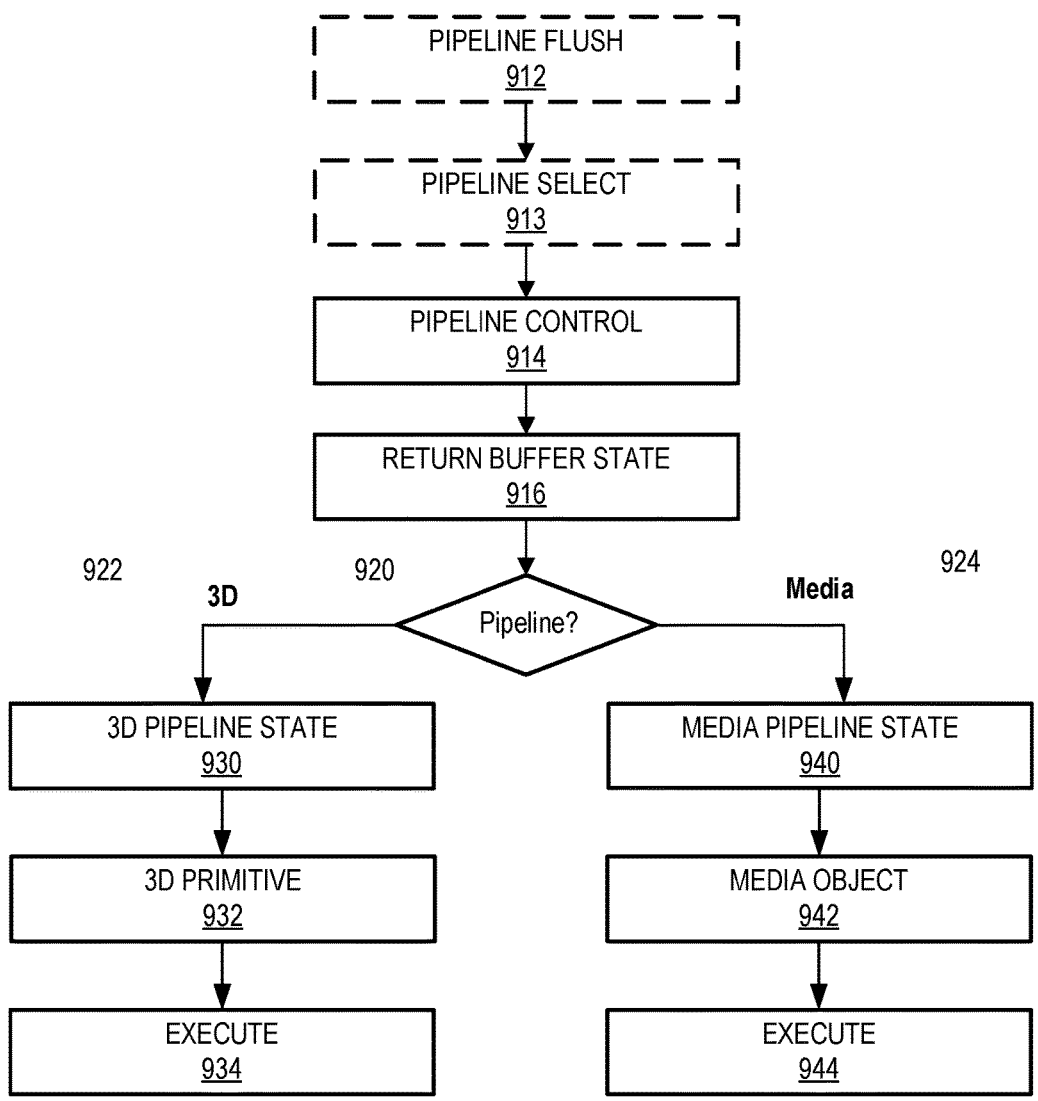

SIGNATURE TABLE - 1500

| | |
|---|---|
| [Event 1510-1] [Signature 1520-1] [Hashes 1530-1] [VS HASH \| HS HASH \| DS HASH \| PS HASH \| CS HASH] [Weight 1540-1] | |
| 1    0x186521000000 | 0x4142F6C8    6.34 |
| [Event 1510-2] [Signature 1520-2] [Hashes 1530-2] [VS HASH \| HS HASH \| DS HASH \| PS HASH \| CS HASH] [Weight 1540-2] | |
| 2    0x1822101C000 | 0x9210FB1B    0x12186BA8    17.99 |
| [Event 1510-3] [Signature 1520-3] [Hashes 1530-3] [VS HASH \| HS HASH \| DS HASH \| PS HASH \| CS HASH] [Weight 1540-3] | |
| 3    0x623000600 | 0x4152BA67    0x3223EF42    1.56 |
| [Event 1510-4] [Signature 1520-4] [Hashes 1530-4] [VS HASH \| HS HASH \| DS HASH \| PS HASH \| CS HASH] [Weight 1540-4] | |
| 4    0x2100020000 | 0xAB86CBE6    0x13292C54    5.72 |
| [Event 1510-5] [Signature 1520-5] [Hashes 1530-5] [VS HASH \| HS HASH \| DS HASH \| PS HASH \| CS HASH] [Weight 1540-5] | |
| 5    0x1822105C000 | 0x4142F6C8    0x3223EF42    0.51 |

FIG. 15

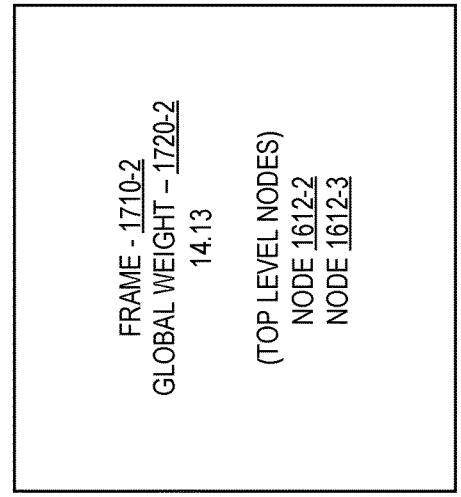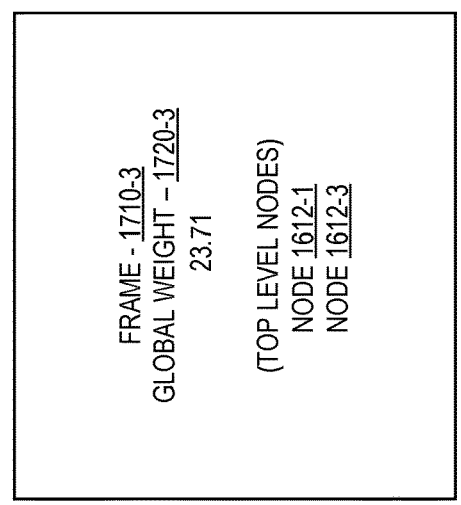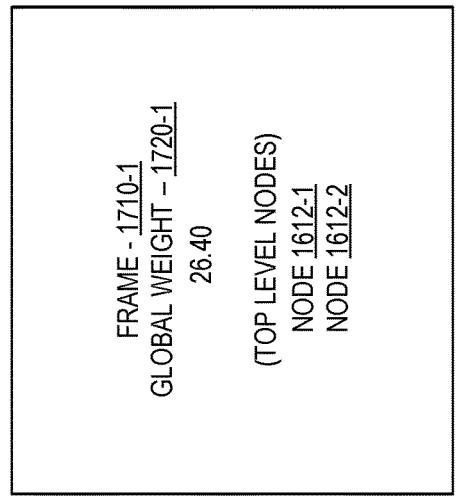
FIG. 17

GRAPHICS HARDWARE BOTTLENECK IDENTIFICATION AND EVENT PRIORITIZATION

BACKGROUND

Modern graphic processors perform a number of events in parallel. For example, a graphics processors can perform combinations of different events, such as, clear, copy, draw, dispatch, or the like in parallel. The order of event processing is constrained based on various dependencies between the events and/or between the various frames to which the events correspond. Due to the highly parallel nature and due to the constraints of events processing, identifying areas where inefficiencies are introduced can be a challenge.

BRIEF DESCRIPTION OF THE DRAWINGS

FIG. 9A illustrates a graphics processor command format, according to an embodiment.

FIG. 9B illustrates a graphics processor command sequence, according to an embodiment.

FIG. 15 illustrates a block diagram of an event table, according to an embodiment.

FIG. 17 illustrates a block diagram of a set of ordered frames, according to an embodiment.

DETAILED DESCRIPTION

Figure 1A:
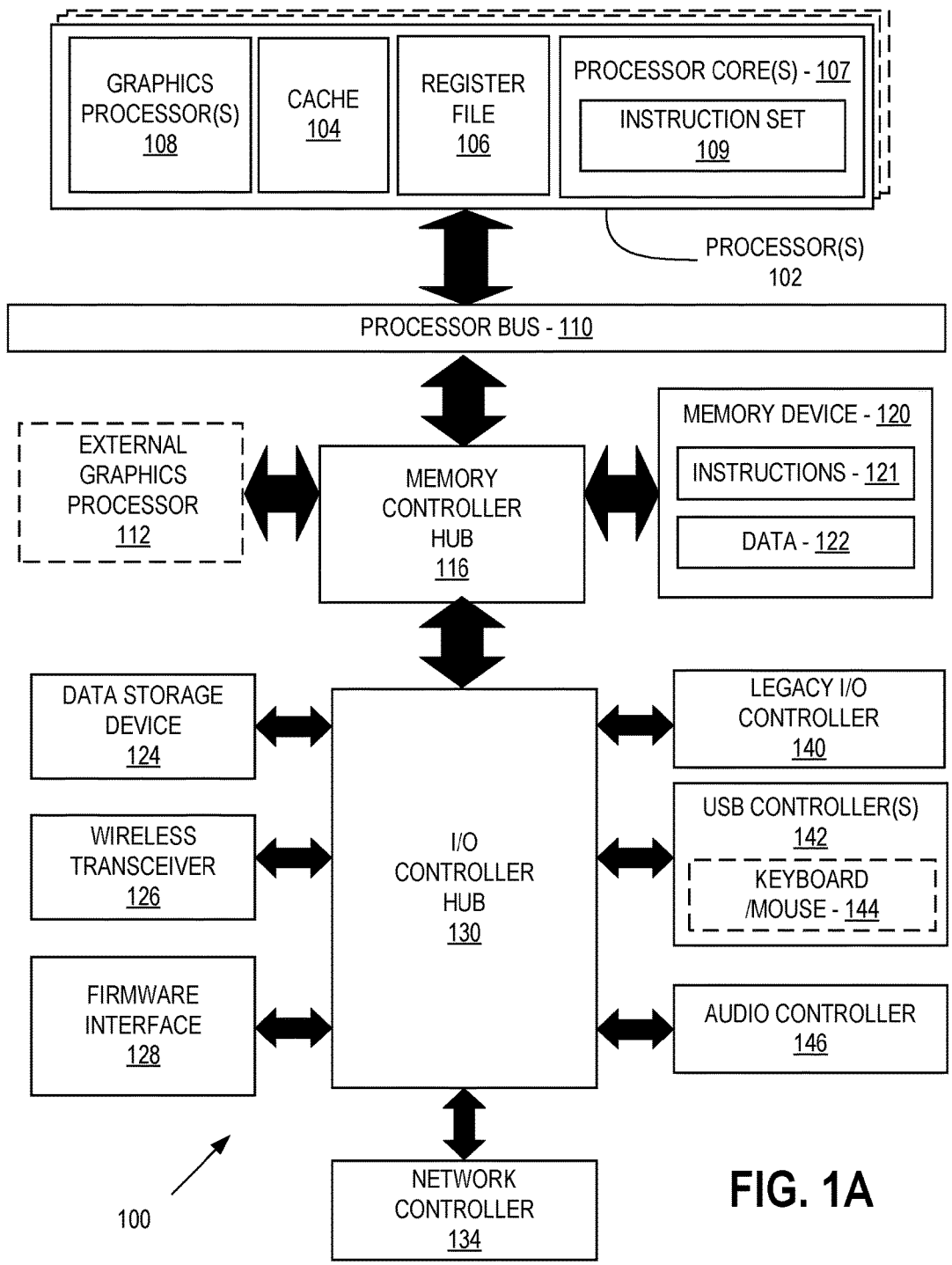
FIG. 1A illustrates a block diagram of a processing system, according to an embodiment.

Various embodiments are generally directed to identifying performance bottlenecks in modern graphics workloads. More particularly, the present disclosure provides identification of events, that if addressed, may result in an improvement in performance.

In some examples, the present disclosure provides to generate a signature and a weight for each event of a graphics workload. An event priority tree is generated by organizing the events into parent and leaf nodes, where parent nodes comprise leaf nodes having a shared hash (e.g., shader, or the like). Additionally, frames can be sorted based on a combined weight of events corresponding to the frames.

Reference is now made to the drawings, wherein like reference numerals are used to refer to like elements throughout. In the following description, for purposes of explanation, numerous specific details are set forth in order to provide a thorough understanding thereof. It may be evident, however, that the novel embodiments can be practiced without these specific details. In other instances, well-known structures and devices are shown in block diagram form in order to facilitate a description thereof. The intention is to cover all modifications, equivalents, and alternatives within the scope of the claims.

Figure 1B:
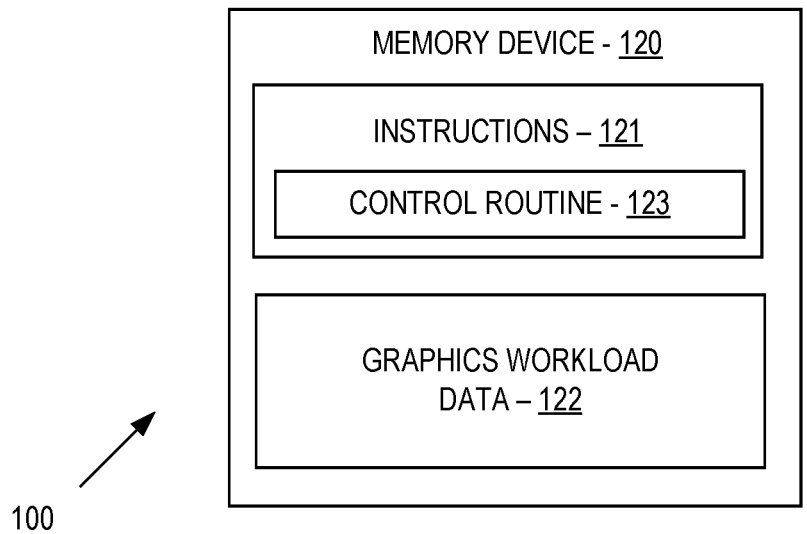
FIG. 1B illustrates a block diagram of a portion of the processing system of FIG. 1A, according to an embodiment.

FIGS. 1A-1B are block diagrams of a processing system 100 to identify performance bottlenecks in a graphics workload, according to an embodiment. In various embodiments the system 100 includes one or more processors 102 and one or more graphics processors 108, and may be a single processor desktop system, a multiprocessor workstation system, or a server system having a large number of processors 102 or processor cores 107. In one embodiment, the system 100 is a processing platform incorporated within a system-on-a-chip (SoC) integrated circuit for use in mobile, handheld, or embedded devices.

An embodiment of system 100 can include (or be incorporated within) a server-based gaming platform, a game console, including a game and media console, a mobile gaming console, a handheld game console, or an online game console. In some embodiments system 100 is a mobile phone, smart phone, tablet computing device or mobile Internet device. Data processing system 100 can also include, couple with, or be integrated within a wearable device, such as a smart watch wearable device, smart eyewear device, augmented reality device, or virtual reality device. In some embodiments, system 100 is a television or set top box device having one or more processors 102 and a graphical interface generated by one or more graphics processors 108.

In some embodiments, the one or more processors 102 each include one or more processor cores 107 to process instructions which, when executed, perform operations for system and user software. In some embodiments, each of the one or more processor cores 107 is configured to process a specific instruction set 109. In some embodiments, instruction set 109 may facilitate Complex Instruction Set Computing (CISC), Reduced Instruction Set Computing (RISC), or computing via a Very Long Instruction Word (VLIW). Multiple processor cores 107 may each process a different instruction set 109, which may include instructions to facilitate the emulation of other instruction sets. Processor core 107 may also include other processing devices, such a Digital Signal Processor (DSP).

In some embodiments, the processor 102 includes cache memory 104. Depending on the architecture, the processor 102 can have a single internal cache or multiple levels of internal cache. In some embodiments, the cache memory is shared among various components of the processor 102. In some embodiments, the processor 102 also uses an external cache (e.g., a Level-3 (L3) cache or Last Level Cache (LLC)) (not shown), which may be shared among processor cores 107 using known cache coherency techniques. A register file 106 is additionally included in processor 102 which may include different types of registers for storing different types of data (e.g., integer registers, floating point registers, status registers, and an instruction pointer register). Some registers may be general-purpose registers, while other registers may be specific to the design of the processor 102. The different registers in the register file 106 are identified by a register address. For example, the register file 106 is depicted including register addresses 141-1, 141-2, 141-3, to 141-N.

In some embodiments, processor 102 is coupled to a processor bus 110 to transmit communication signals such as address, data, or control signals between processor 102 and other components in system 100. In one embodiment the system 100 uses exemplary 'hub' system architecture, including a memory controller hub 116 and an Input Output (I/O) controller hub 130. Memory controller hub 116 may facilitate communication between a memory device and other components of system 100, while I/O Controller Hub (ICH) 130 may provide connections to I/O devices via a local I/O bus. In one embodiment, the logic of the memory controller hub 116 is integrated within the processor.

Memory device 120 can be a dynamic random access memory (DRAM) device, a static random access memory (SRAM) device, flash memory device, phase-change memory device, or some other memory device having suitable performance to serve as process memory. In one embodiment the memory device 120 can operate as system memory for the system 100, to store graphics workload data 122 and instructions 121 for use when the one or more processors 102 executes an application or process. Memory controller hub 116 also couples with an optional external graphics processor 112, which may communicate with the one or more graphics processors 108 in processors 102 to perform graphics and media operations.

In some embodiments, ICH 130 enables peripherals to connect to memory device 120 and processor 102 via a high-speed I/O bus. The I/O peripherals include, but are not limited to, an audio controller 146, a firmware interface 128, a wireless transceiver 126 (e.g., Wi-Fi, Bluetooth), a data storage device 124 (e.g., hard disk drive, flash memory, etc.), and a legacy I/O controller 140 for coupling legacy (e.g., Personal System 2 (PS/2)) devices to the system. One or more Universal Serial Bus (USB) controllers 142 connect input devices, such as keyboard and mouse 144 combinations. A network controller 134 may also couple to ICH 130. In some embodiments, a high-performance network controller (not shown) couples to processor bus 110. It will be appreciated that the system 100 shown is exemplary and not limiting, as other types of data processing systems that are differently configured may also be used. For example, the ICH 130 may be integrated within the one or more processor 102, or the memory controller hub 116 and ICH 130 may be integrated into a discreet external graphics processor, such as the external graphics processor 112.

Figure 10:
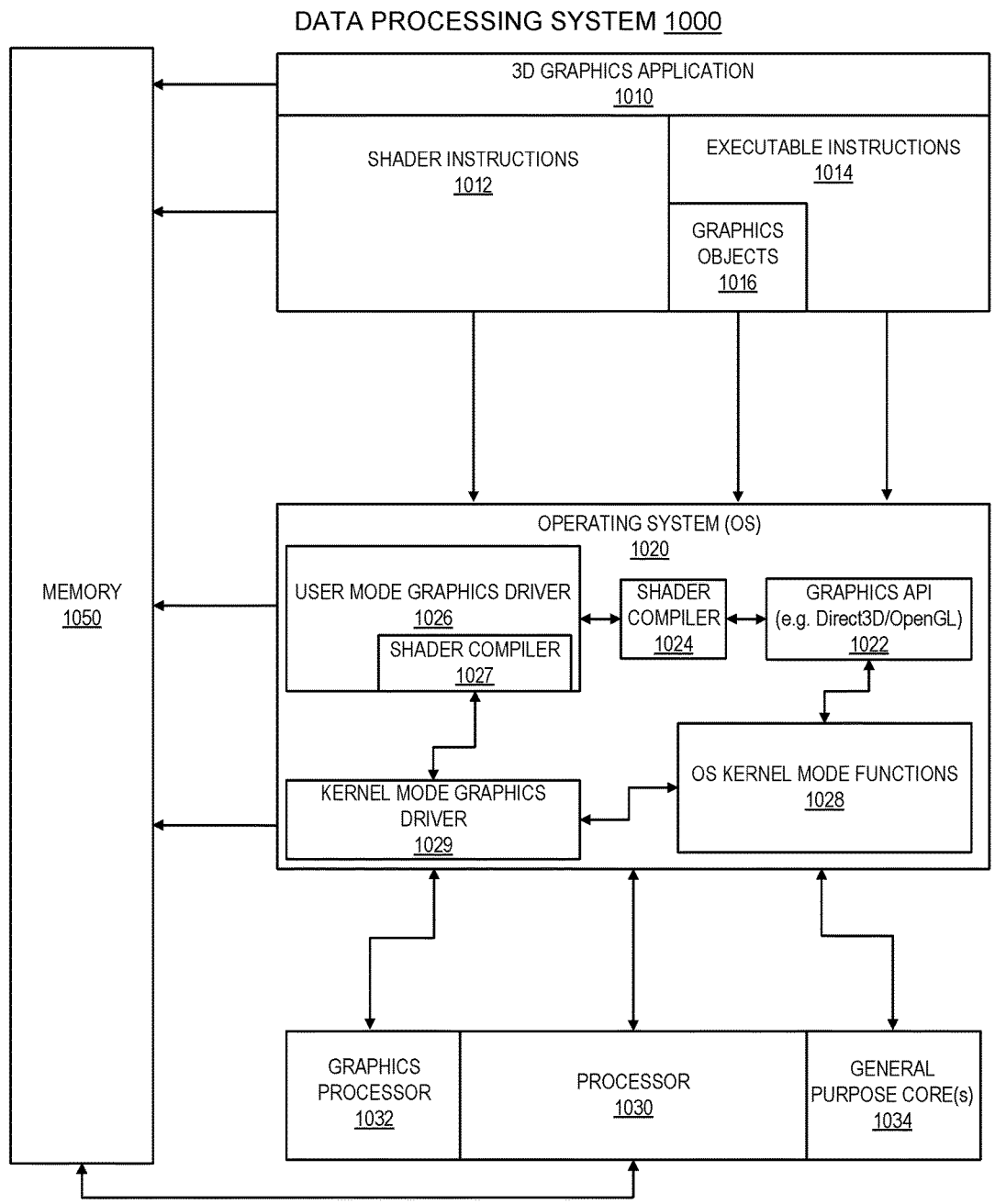
FIG. 10 illustrates a block diagram of graphics software architecture, according to an embodiment.

During operation, the processor cores 107 may execute instructions to identify performance bottlenecks in execution of a graphics workload (e.g., refer to 3D graphics application 1010 and/or graphics objects 1016 of FIG. 10, or the like) by the graphics processor(s) 108 and/or external graphics processor 112. In particular, processor cores 107 may execute instructions 121 including control routine 123 to generate an event priority tree 125 based on a number of events. Each of the events can include a signature and a weight. In some examples, the signature includes an indication of a behavior of the event during execution on the graphics processor(s) 108 and/or the external graphics processor 112. For example, the signatures can include an indication of area, or architectural blocks (e.g., refer to FIG. 8 and/or FIG. 14, or the like) in which bottlenecks are occurring. In some examples, the event priority tree 125 (refer to FIG. 16) comprises parent nodes and leaf nodes, where the parent nodes correspond to leaf nodes of events sharing a particular architectural element (e.g., shader, or the like). Parent and leaf nodes can be sorted based on weight (or combined weight) of the events.

Additionally, the present disclosure can be implemented to identify performance bottlenecks across frames of a video to be rendered. In particular, the events discussed above may correspond to multiple frames. The frames can be sorted based on a combined weight of the events corresponding to each frame.

Accordingly, performance bottlenecks can be identified and analysis of such bottlenecks can be increased based on the event priority tree and/or sorted frames. As the present disclosure is applicable to graphics workloads and graphics processors, FIGS. 2-12 are given to provide clarity and breadth to the disclosure. FIGS. 13-20 provide exemplary implementations to prioritize events to increase performance of a graphics workload as described herein.

Figure 2:
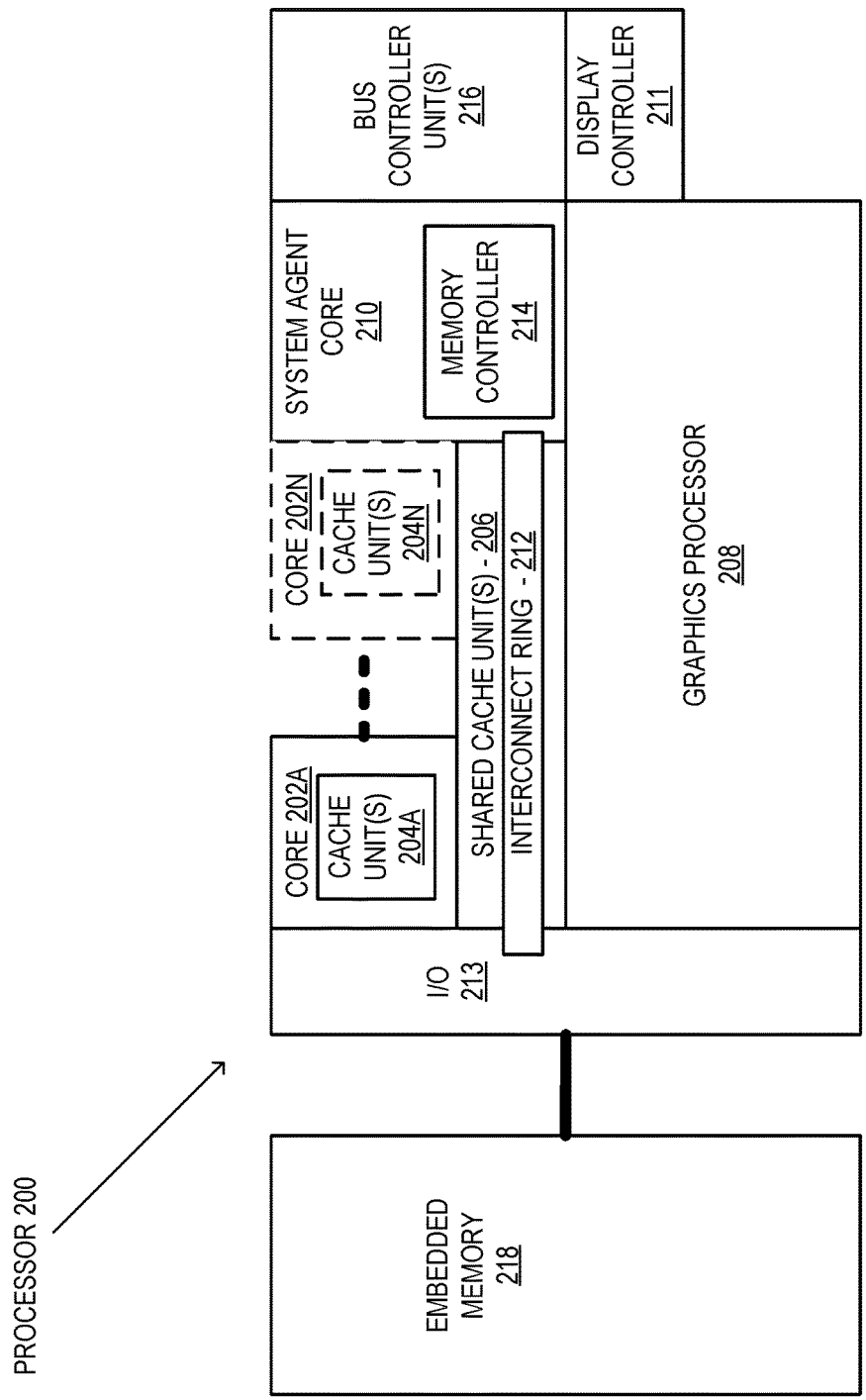
FIG. 2 illustrates a block diagram of a processor, according to an embodiment.

FIG. 2 is a block diagram of an embodiment of a processor 200 to suppress redundant source operand reads and replicate read data for operands where the read requests were suppressed. In some examples, the processor 200 may have one or more processor cores 202A-202N, an integrated memory controller 214, and an integrated graphics processor 208. Those elements of FIG. 2 having the same reference numbers (or names) as the elements of any other figure herein can operate or function in any manner similar to that described elsewhere herein, but are not limited to such. Processor 200 can include additional cores up to and including additional core 202N represented by the dashed lined boxes. Each of processor cores 202A-202N includes one or more internal cache units 204A-204N. In some embodiments each processor core also has access to one or more shared cached units 206.

The internal cache units 204A-204N and shared cache units 206 represent a cache memory hierarchy within the processor 200. The cache memory hierarchy may include at least one level of instruction and data cache within each processor core and one or more levels of shared mid-level cache, such as a Level 2 (L2), Level 3 (L3), Level 4 (L4), or other levels of cache, where the highest level of cache before external memory is classified as the LLC. In some embodiments, cache coherency logic maintains coherency between the various cache units 206 and 204A-204N.

In some embodiments, processor 200 may also include a set of one or more bus controller units 216 and a system agent core 210. The one or more bus controller units 216 manage a set of peripheral buses, such as one or more Peripheral Component Interconnect buses (e.g., PCI, PCI Express). System agent core 210 provides management functionality for the various processor components. In some embodiments, system agent core 210 includes one or more integrated memory controllers 214 to manage access to various external memory devices (not shown).

In some embodiments, one or more of the processor cores 202A-202N include support for simultaneous multi-threading. In such embodiment, the system agent core 210 includes components for coordinating and operating cores 202A-202N during multi-threaded processing. System agent core 210 may additionally include a power control unit (PCU), which includes logic and components to regulate the power state of processor cores 202A-202N and graphics processor 208.

In some embodiments, processor 200 additionally includes graphics processor 208 to execute graphics processing operations. In some embodiments, the graphics processor 208 couples with the set of shared cache units 206, and the system agent core 210, including the one or more integrated memory controllers 214. In some embodiments, a display controller 211 is coupled with the graphics processor 208 to drive graphics processor output to one or more coupled displays. In some embodiments, display controller 211 may be a separate module coupled with the graphics processor via at least one interconnect, or may be integrated within the graphics processor 208 or system agent core 210.

In some embodiments, a ring based interconnect unit 212 (ring interconnect) is used to couple the internal components of the processor 200. However, an alternative interconnect unit may be used, such as a point-to-point interconnect, a switched interconnect, or other techniques, including techniques well known in the art. In some embodiments, graphics processor 208 couples with the ring interconnect 212 via an I/O link 213.

The exemplary I/O link 213 represents at least one of multiple varieties of I/O interconnects, including an on package I/O interconnect that facilitates communication between various processor components and a high-performance embedded memory 218, such as an eDRAM module. In some embodiments, each of the processor cores 202-202N and graphics processor 208 use embedded memory 218 as a shared Last Level Cache.

In some embodiments, processor cores 202A-202N are homogenous cores executing the same instruction set architecture. In another embodiment, processor cores 202A-202N are heterogeneous in terms of instruction set architecture (ISA), where one or more of processor cores 202A-N execute a first instruction set and at least one of the other cores executes a subset of the first instruction set or a different instruction set. In one embodiment processor cores 202A-202N are heterogeneous in terms of microarchitecture, where one or more cores having relatively higher power consumption coupled with one or more power cores having lower power consumption. Additionally, processor 200 can be implemented on one or more chips or as an SoC integrated circuit having the illustrated components, in addition to other components.

Figure 3:
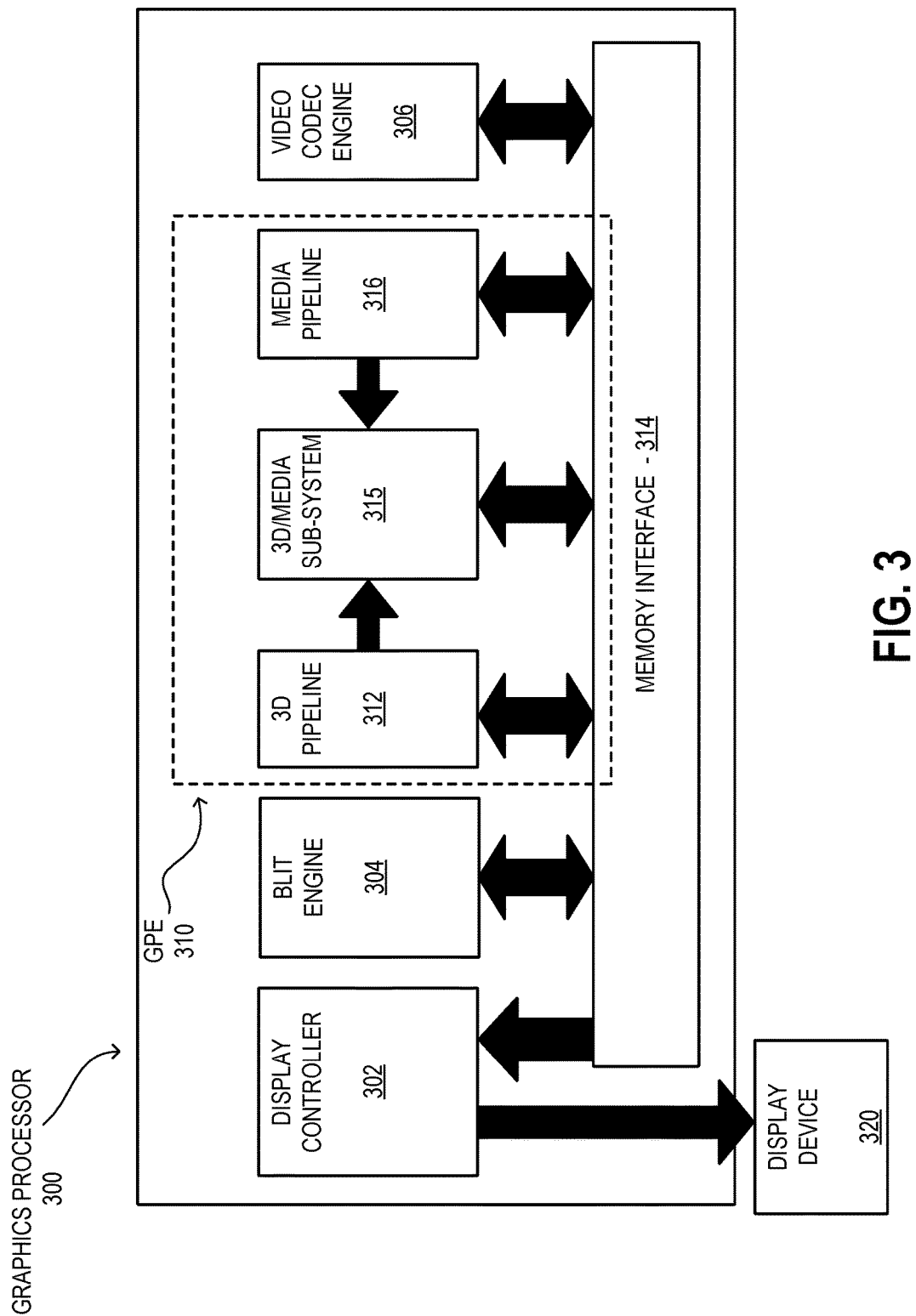
FIG. 3 illustrates a block diagram of a graphics processor, according to an embodiment.

FIG. 3 is a block diagram of a graphics processor 300 to suppress redundant source operand reads and replicate read operands. In some examples, the processor 300 may be a discrete graphics processing unit, or may be a graphics processor integrated with a plurality of processing cores. In some embodiments, the graphics processor communicates via a memory mapped I/O interface to registers on the graphics processor and with commands placed into the processor memory. In some embodiments, graphics processor 300 includes a memory interface 314 to access memory. Memory interface 314 can be an interface to local memory, one or more internal caches, one or more shared external caches, and/or to system memory.

In some embodiments, graphics processor 300 also includes a display controller 302 to drive display output data to a display device 320. Display controller 302 includes hardware for one or more overlay planes for the display and composition of multiple layers of video or user interface elements. In some embodiments, graphics processor 300 includes a video codec engine 306 to encode, decode, or transcode media to, from, or between one or more media encoding formats, including, but not limited to Moving Picture Experts Group (MPEG) formats such as MPEG-2, Advanced Video Coding (AVC) formats such as H.264/MPEG-4 AVC, as well as the Society of Motion Picture & Television Engineers (SMPTE) 421M/VC-1, and Joint Photographic Experts Group (JPEG) formats such as JPEG, and Motion JPEG (MJPEG) formats.

In some embodiments, graphics processor 300 includes a block image transfer (BLIT) engine 304 to perform two-dimensional (2D) rasterizer operations including, for example, bit-boundary block transfers. However, in one embodiment, 2D graphics operations are performed using one or more components of graphics processing engine (GPE) 310. In some embodiments, GPE engine 310 is a compute engine for performing graphics operations, including three-dimensional (3D) graphics operations and media operations.

In some embodiments, GPE 310 includes a 3D pipeline 312 for performing 3D operations, such as rendering three-dimensional images and scenes using processing functions that act upon 3D primitive shapes (e.g., rectangle, triangle, etc.). The 3D pipeline 312 includes programmable and fixed function elements that perform various tasks within the element and/or spawn execution threads to a 3D/Media sub-system 315. While 3D pipeline 312 can be used to perform media operations, an embodiment of GPE 310 also includes a media pipeline 316 that is specifically used to perform media operations, such as video post-processing and image enhancement.

In some embodiments, media pipeline 316 includes fixed function or programmable logic units to perform one or more specialized media operations, such as video decode acceleration, video de-interlacing, and video encode acceleration in place of, or on behalf of video codec engine 306. In some embodiments, media pipeline 316 additionally includes a thread spawning unit to spawn threads for execution on 3D/Media sub-system 315. The spawned threads perform computations for the media operations on one or more graphics execution units included in 3D/Media sub-system 315.

In some embodiments, 3D/Media subsystem 315 includes logic for executing threads spawned by 3D pipeline 312 and media pipeline 316. In one embodiment, the pipelines send thread execution requests to 3D/Media subsystem 315, which includes thread dispatch logic for arbitrating and dispatching the various requests to available thread execution resources. The execution resources include an array of graphics execution units to process the 3D and media threads. In some embodiments, 3D/Media subsystem 315 includes one or more internal caches for thread instructions and data. In some embodiments, the subsystem also includes shared memory, including registers and addressable memory, to share data between threads and to store output data.

Figure 4:
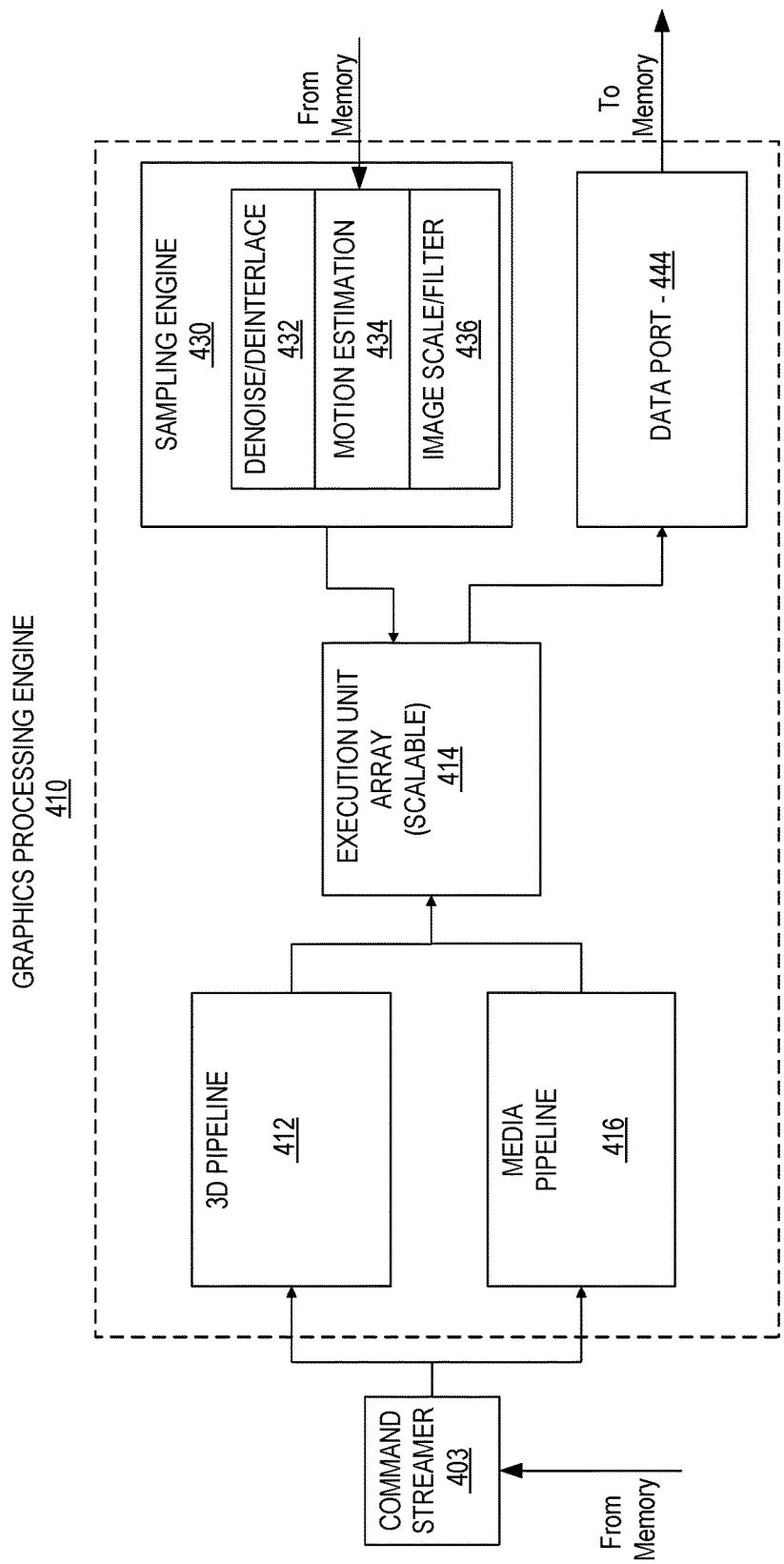
FIG. 4 illustrates a block diagram of a graphics processing engine, according to an embodiment.

FIG. 4 is a block diagram of a graphics processing engine 410 of a graphics processor in accordance with some embodiments. In one embodiment, the GPE 410 is a version of the GPE 610 shown in FIG. 3. Elements of FIG. 4 having the same reference numbers (or names) as the elements of any other figure herein can operate or function in any manner similar to that described elsewhere herein, but are not limited to such.

In some embodiments, GPE 410 couples with a command streamer 403, which provides a command stream to the GPE 3D and media pipelines 412, 416. In some embodiments, command streamer 403 is coupled to memory, which can be system memory, or one or more of internal cache memory and shared cache memory. In some embodiments, command streamer 403 receives commands from the memory and sends the commands to 3D pipeline 412 and/or media pipeline 416. The commands are directives fetched from a ring buffer, which stores commands for the 3D and media pipelines 412, 416. In one embodiment, the ring buffer can additionally include batch command buffers storing batches of multiple commands. The 3D and media pipelines 412, 416 process the commands by performing operations via logic within the respective pipelines or by dispatching one or more execution threads to an execution unit array 414. In some embodiments, execution unit array 414 is scalable, such that the array includes a variable number of execution units based on the target power and performance level of GPE 410.

In some embodiments, a sampling engine 430 couples with memory (e.g., cache memory or system memory) and execution unit array 414. In some embodiments, sampling engine 430 provides a memory access mechanism for execution unit array 414 that allows execution array 414 to read graphics and media data from memory. In some embodiments, sampling engine 430 includes logic to perform specialized image sampling operations for media.

In some embodiments, the specialized media sampling logic in sampling engine 430 includes a de-noise/de-interlace module 432, a motion estimation module 434, and an image scaling and filtering module 436. In some embodiments, de-noise/de-interlace module 432 includes logic to perform one or more of a de-noise or a de-interlace algorithm on decoded video data. The de-interlace logic combines alternating fields of interlaced video content into a single frame of video. The de-noise logic reduces or removes data noise from video and image data. In some embodiments, the de-noise logic and de-interlace logic are motion adaptive and use spatial or temporal filtering based on the amount of motion detected in the video data. In some embodiments, the de-noise/de-interlace module 432 includes dedicated motion detection logic (e.g., within the motion estimation engine 434).

In some embodiments, motion estimation engine 434 provides hardware acceleration for video operations by performing video acceleration functions such as motion vector estimation and prediction on video data. The motion estimation engine determines motion vectors that describe the transformation of image data between successive video frames. In some embodiments, a graphics processor media codec uses video motion estimation engine 434 to perform operations on video at the macro-block level that may otherwise be too computationally intensive to perform with a general-purpose processor. In some embodiments, motion estimation engine 434 is generally available to graphics processor components to assist with video decode and processing functions that are sensitive or adaptive to the direction or magnitude of the motion within video data.

In some embodiments, image scaling and filtering module 436 performs image-processing operations to enhance the visual quality of generated images and video. In some embodiments, scaling and filtering module 436 processes image and video data during the sampling operation before providing the data to execution unit array 414.

In some embodiments, the GPE 410 includes a data port 444, which provides an additional mechanism for graphics subsystems to access memory. In some embodiments, data port 444 facilitates memory access for operations including render target writes, constant buffer reads, scratch memory space reads/writes, and media surface accesses. In some embodiments, data port 444 includes cache memory space to cache accesses to memory. The cache memory can be a single data cache or separated into multiple caches for the multiple subsystems that access memory via the data port (e.g., a render buffer cache, a constant buffer cache, etc.). In some embodiments, threads executing on an execution unit in execution unit array 414 communicate with the data port by exchanging messages via a data distribution interconnect that couples each of the sub-systems of GPE 410.

Figure 5:
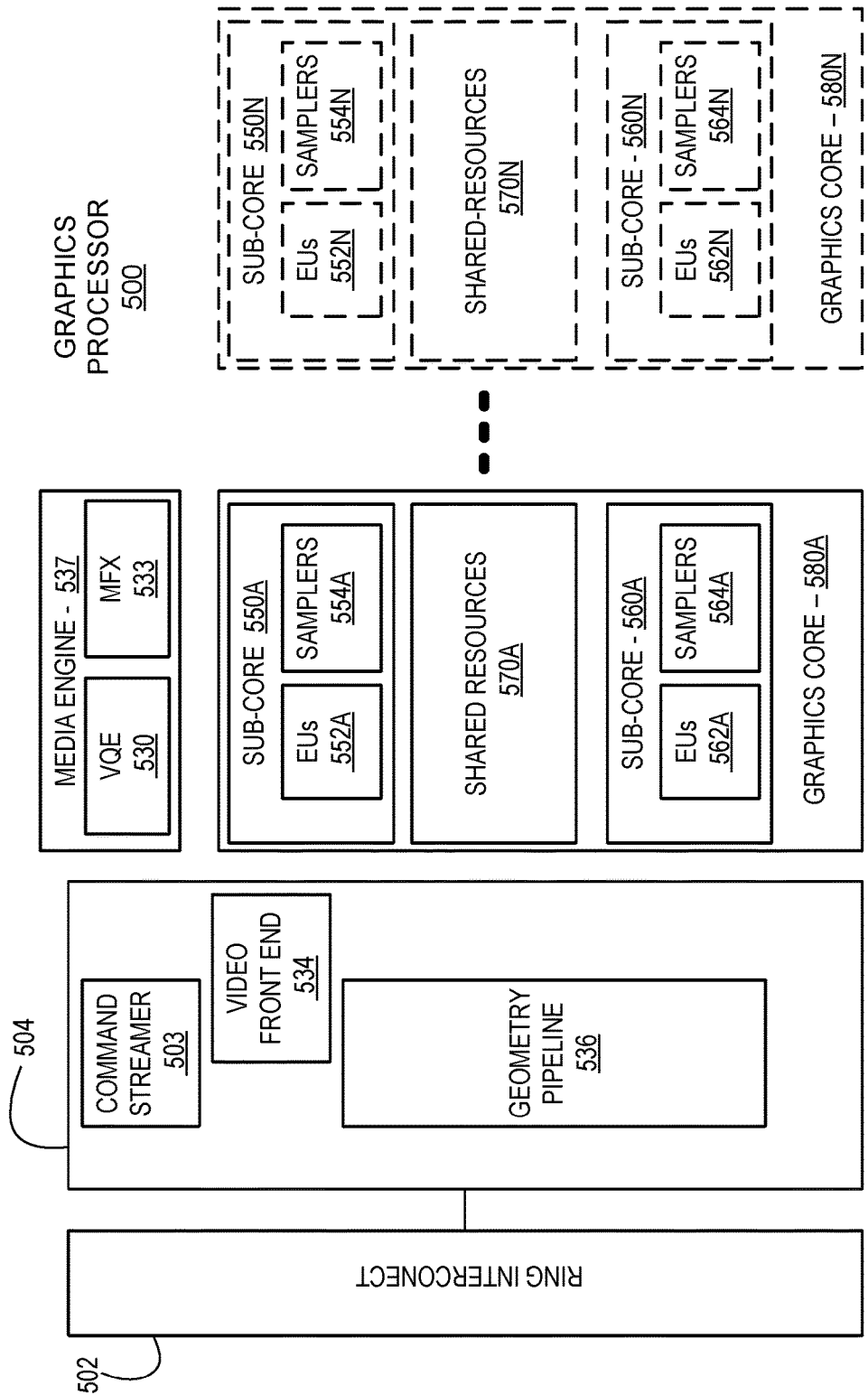
FIG. 5 illustrates a block diagram of a graphics processor, according to another embodiment.

FIG. 5 is a block diagram of another embodiment of a graphics processor 500 to suppress redundant source oper- and reads and replicate read data. Elements of FIG. 5 having the same reference numbers (or names) as the elements of any other figure herein can operate or function in any manner similar to that described elsewhere herein, but are not limited to such.

In some embodiments, graphics processor 500 includes a ring interconnect 502, a pipeline front-end 504, a media engine 537, and graphics cores 580A-580N. In some embodiments, ring interconnect 502 couples the graphics processor to other processing units, including other graphics processors or one or more general-purpose processor cores. In some embodiments, the graphics processor is one of many processors integrated within a multi-core processing system.

In some embodiments, graphics processor 500 receives batches of commands via ring interconnect 502. A command streamer 503 in pipeline front-end 504 may interpret the incoming commands. In some embodiments, graphics processor 500 includes scalable execution logic to perform 3D geometry processing and media processing via the graphics core(s) 580A-580N. For 3D geometry processing commands, command streamer 503 supplies commands to geometry pipeline 536. For at least some media processing commands, command streamer 503 supplies the commands to a video front end 534, which couples with a media engine 537. In some embodiments, media engine 537 includes a Video Quality Engine (VQE) 530 for video and image post-processing and a multi-format encode/decode (MFX) 533 engine to provide hardware-accelerated media data encode and decode. In some embodiments, geometry pipeline 536 and media engine 537 each generate execution threads for the thread execution resources provided by at least one graphics core 580A.

In some embodiments, graphics processor 500 includes scalable thread execution resources featuring modular cores 580A-580N (sometimes referred to as core slices), each having multiple sub-cores 550A-550N, 560A-560N (sometimes referred to as core sub-slices). In some embodiments, graphics processor 500 can have any number of graphics cores 580A through 580N. In some embodiments, graphics processor 500 includes a graphics core 580A having at least a first sub-core 550A and a second core sub-core 560A. In other embodiments, the graphics processor is a low power processor with a single sub-core (e.g., 550A). In some embodiments, graphics processor 500 includes multiple graphics cores 580A-580N, each including a set of first sub-cores 550A-550N and a set of second sub-cores 560A-560N. Each sub-core in the set of first sub-cores 550A-550N includes at least a first set of execution units 552A-552N and media/texture samplers 554A-554N. Each sub-core in the set of second sub-cores 560A-560N includes at least a second set of execution units 562A-562N and samplers 564A-564N. In some embodiments, each sub-core 550A-550N, 560A-560N shares a set of shared resources 570A-570N. In some embodiments, the shared resources include shared cache memory and pixel operation logic. Other shared resources may also be included in the various embodiments of the graphics processor.

Figure 6:
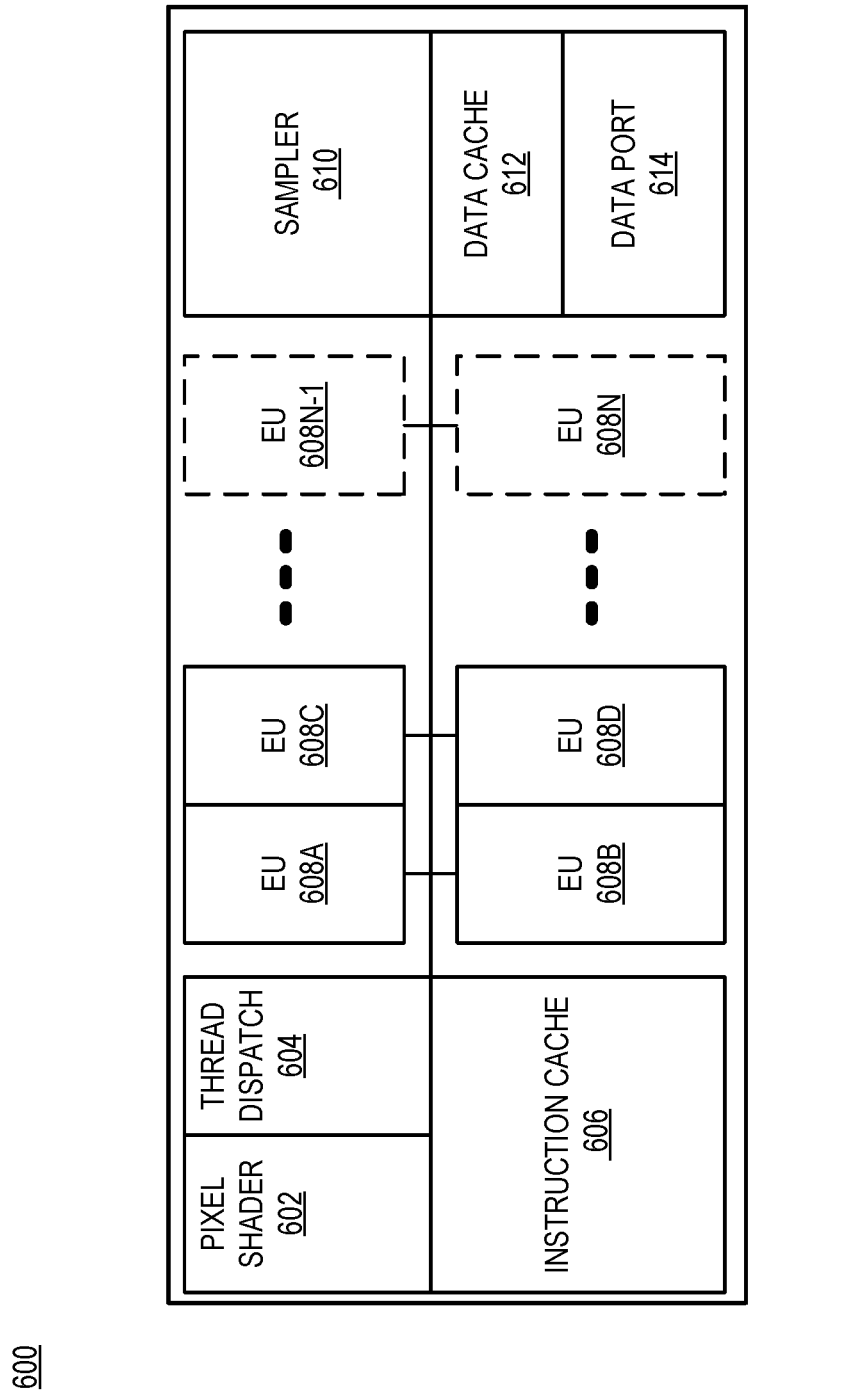
FIG. 6 illustrates thread execution logic, according to an embodiment.

FIG. 6 illustrates thread execution logic 600 including an array of processing elements employed in some embodiments of a GPE. Elements of FIG. 6 having the same reference numbers (or names) as the elements of any other figure herein can operate or function in any manner similar to that described elsewhere herein, but are not limited to such.

In some embodiments, thread execution logic 600 includes a pixel shader 602, a thread dispatcher 604, instruction cache 606, a scalable execution unit array including a plurality of execution units 608A-608N, a sampler 610, a data cache 612, and a data port 614. In one embodiment the included components are interconnected via an interconnect fabric that links to each of the components. In some embodiments, thread execution logic 600 includes one or more connections to memory, such as system memory or cache memory, through one or more of instruction cache 606, data port 614, sampler 610, and execution unit array 608A-608N. In some embodiments, each execution unit (e.g. 608A) is an individual vector processor capable of executing multiple simultaneous threads and processing multiple data elements in parallel for each thread. In some embodiments, execution unit array 608A-608N includes any number individual execution units.

In some embodiments, execution unit array 608A-608N is primarily used to execute "shader" programs. In some embodiments, the execution units in array 608A-608N execute an instruction set that includes native support for many standard 3D graphics shader instructions, such that shader programs from graphics libraries (e.g., Direct 3D and OpenGL) are executed with minimal translation. The execution units may support vertex and geometry processing (e.g., vertex programs, geometry programs, vertex shaders), pixel processing (e.g., pixel shaders, fragment shaders) and general-purpose processing (e.g., compute, media, hull, and/or domain shaders).

Each execution unit in execution unit array 608A-608N operates on arrays of data elements. The number of data elements is the "execution size," or the number of channels for the instruction. An execution channel is a logical unit of execution for data element access, masking, and flow control within instructions. The number of channels may be independent of the number of physical Arithmetic Logic Units (ALUs) or Floating Point Units (FPUs) for a particular graphics processor. In some embodiments, execution units 608A-608N support integer and floating-point data types.

The execution unit instruction set includes single instruction multiple data (SIMD) instructions. The various data elements can be stored as a packed data type in a register and the execution unit will process the various elements based on the data size of the elements. For example, when operating on a 256-bit wide vector, the 256 bits of the vector are stored in a register and the execution unit operates on the vector as four separate 64-bit packed data elements (Quad-Word (QW) size data elements), eight separate 32-bit packed data elements (Double Word (DW) size data elements), sixteen separate 16-bit packed data elements (Word (W) size data elements), or thirty-two separate 8-bit data elements (byte (B) size data elements). However, different vector widths and register sizes are possible.

One or more internal instruction caches (e.g., 606) are included in the thread execution logic 600 to cache thread instructions for the execution units. In some embodiments, one or more data caches (e.g., 612) are included to cache thread data during thread execution. In some embodiments, sampler 610 is included to provide texture sampling for 3D operations and media sampling for media operations. In some embodiments, sampler 610 includes specialized texture or media sampling functionality to process texture or media data during the sampling process before providing the sampled data to an execution unit.

During execution, the graphics and media pipelines send thread initiation requests to thread execution logic 600 via thread spawning and dispatch logic. In some embodiments, thread execution logic 600 includes a local thread dispatcher 604 that arbitrates thread initiation requests from the graphics and media pipelines and instantiates the requested threads on one or more execution units 608A-608N. For example, the geometry pipeline (e.g., 536 of FIG. 5) dispatches vertex processing, tessellation, or geometry processing threads to thread execution logic 600 (FIG. 6). In some embodiments, thread dispatcher 604 can also process runtime thread spawning requests from the executing shader programs.

Once a group of geometric objects has been processed and rasterized into pixel data, pixel shader 602 is invoked to further compute output information and cause results to be written to output surfaces (e.g., color buffers, depth buffers, stencil buffers, etc.). In some embodiments, pixel shader 602 calculates the values of the various vertex attributes that are to be interpolated across the rasterized object. In some embodiments, pixel shader 602 then executes an application programming interface (API)-supplied pixel shader program. To execute the pixel shader program, pixel shader 602 dispatches threads to an execution unit (e.g., 608A) via thread dispatcher 604. In some embodiments, pixel shader 602 uses texture sampling logic in sampler 610 to access texture data in texture maps stored in memory. Arithmetic operations on the texture data and the input geometry data compute pixel color data for each geometric fragment, or discards one or more pixels from further processing.

In some embodiments, the data port 614 provides a memory access mechanism for the thread execution logic 600 output processed data to memory for processing on a graphics processor output pipeline. In some embodiments, the data port 614 includes or couples to one or more cache memories (e.g., data cache 612) to cache data for memory access via the data port.

Figure 7:
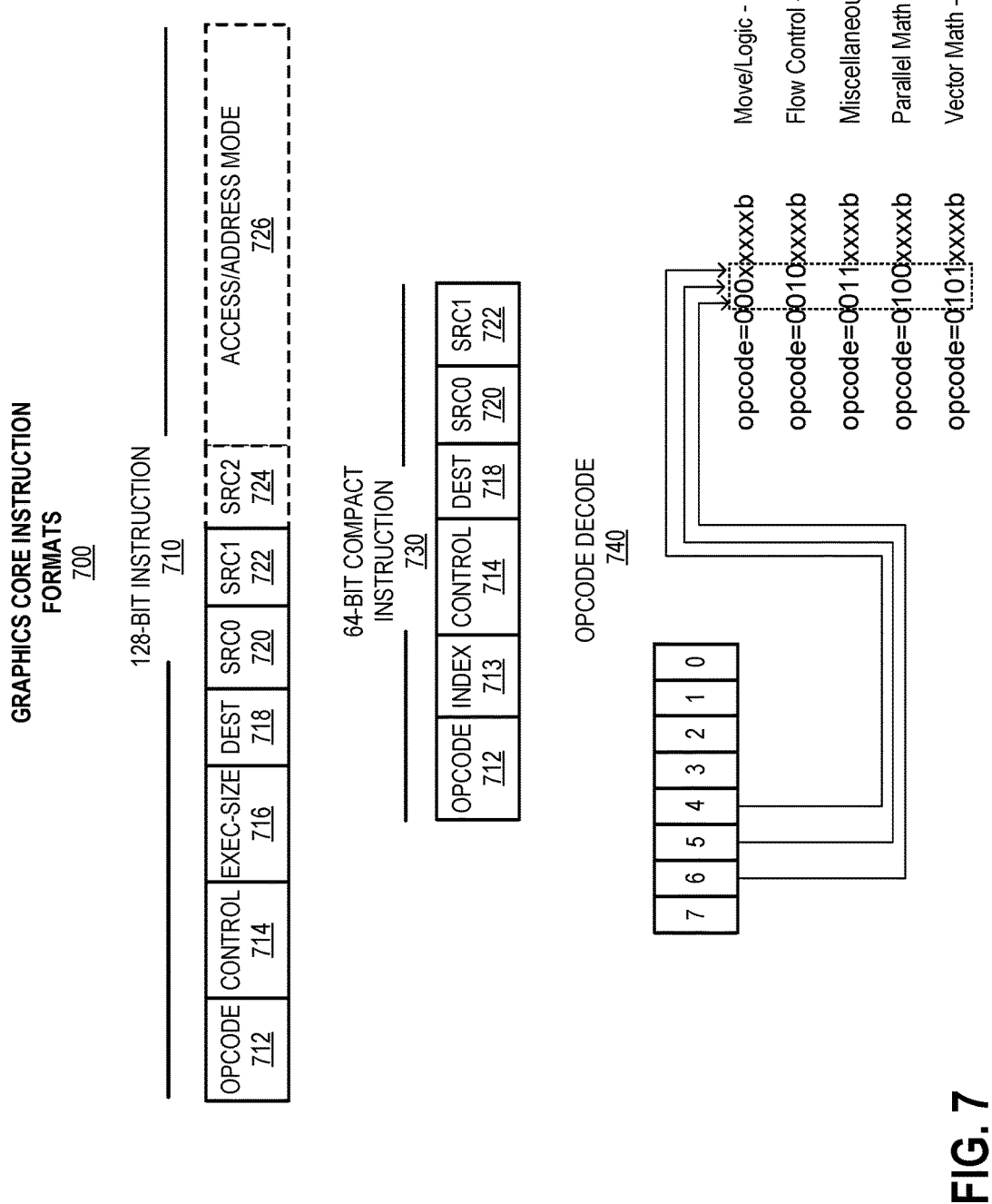
FIG. 7 illustrates a block diagram of graphics processor instruction formats, according to an embodiment.

FIG. 7 is a block diagram illustrating a graphics processor instruction formats 700 according to some embodiments. In one or more embodiment, the graphics processor execution units support an instruction set having instructions in multiple formats. The solid lined boxes illustrate the components that are generally included in an execution unit instruction, while the dashed lines include components that are optional or that are only included in a sub-set of the instructions. In some embodiments, instruction format 700 described and illustrated are macro-instructions, in that they are instructions supplied to the execution unit, as opposed to micro-operations resulting from instruction decode once the instruction is processed.

In some embodiments, the graphics processor execution units natively support instructions in a 128-bit format 710. A 64-bit compacted instruction format 730 is available for some instructions based on the selected instruction, instruction options, and number of operands. The native 128-bit format 710 provides access to all instruction options, while some options and operations are restricted in the 64-bit format 730. The native instructions available in the 64-bit format 730 vary by embodiment. In some embodiments, the instruction is compacted in part using a set of index values in an index field 713. The execution unit hardware references a set of compaction tables based on the index values and uses the compaction table outputs to reconstruct a native instruction in the 128-bit format 710.

For each format, instruction opcode 712 defines the operation that the execution unit is to perform. The execution units execute each instruction in parallel across the multiple data elements of each operand. For example, in response to an add instruction the execution unit performs a simultaneous add operation across each color channel representing a texture element or picture element. By default, the execution unit performs each instruction across all data channels of the operands. In some embodiments, instruction control field 714 enables control over certain execution options, such as channels selection (e.g., predication) and data channel order (e.g., swizzle). For 128-bit instructions 710 an exec-size field 716 limits the number of data channels that will be executed in parallel. In some embodiments, exec-size field 716 is not available for use in the 64-bit compact instruction format 730.

Some execution unit instructions have up to three operands including two source operands, SRC0 722, SRC1 722, and one destination 718. In some embodiments, the execution units support dual destination instructions, where one of the destinations is implied. Data manipulation instructions can have a third source operand (e.g., SRC2 724), where the instruction opcode 712 determines the number of source operands. An instruction's last source operand can be an immediate (e.g., hard-coded) value passed with the instruction.

In some embodiments, the 128-bit instruction format 710 includes an access/address mode information 726 specifying, for example, whether direct register addressing mode or indirect register addressing mode is used. When direct register addressing mode is used, bits in the instruction 710 directly provide the register address of one or more operands.

In some embodiments, the 128-bit instruction format 710 includes an access/address mode field 726, which specifies an address mode and/or an access mode for the instruction. In one embodiment the access mode to define a data access alignment for the instruction. Some embodiments support access modes including a 16-byte aligned access mode and a 1-byte aligned access mode, where the byte alignment of the access mode determines the access alignment of the instruction operands. For example, when in a first mode, the instruction 710 may use byte-aligned addressing for source and destination operands and when in a second mode, the instruction 710 may use 16-byte-aligned addressing for all source and destination operands.

In one embodiment, the address mode portion of the access/address mode field 726 determines whether the instruction is to use direct or indirect addressing. When direct register addressing mode is used bits in the instruction 710 directly provide the register address of one or more operands. When indirect register addressing mode is used, the register address of one or more operands may be computed based on an address register value and an address immediate field in the instruction.

In some embodiments instructions are grouped based on opcode 712 bit-fields to simplify Opcode decode 740. For an 8-bit opcode, bits 4, 5, and 6 allow the execution unit to determine the type of opcode. The precise opcode grouping shown is merely an example. In some embodiments, a move and logic opcode group 742 includes data movement and logic instructions (e.g., move (mov), compare (cmp)). In some embodiments, move and logic group 742 shares the five most significant bits (MSB), where move (mov) instructions are in the form of 0000xxxxb and logic instructions are in the form of 0001xxxxb. A flow control instruction group 744 (e.g., call, jump (jmp)) includes instructions in the form of 0010xxxxb (e.g., 0x20). A miscellaneous instruction group 746 includes a mix of instructions, including synchronization instructions (e.g., wait, send) in the form of 0011xxxxb (e.g., 0x30). A parallel math instruction group 748 includes component-wise arithmetic instructions (e.g., add, multiply (mul)) in the form of 0100xxxxb (e.g., 0x40). The parallel math group 748 performs the arithmetic operations in parallel across data channels. The vector math group 750 includes arithmetic instructions (e.g., dp4) in the form of 0101xxxxb (e.g., 0x50). The vector math group performs arithmetic such as dot product calculations on vector operands.

Figure 8:
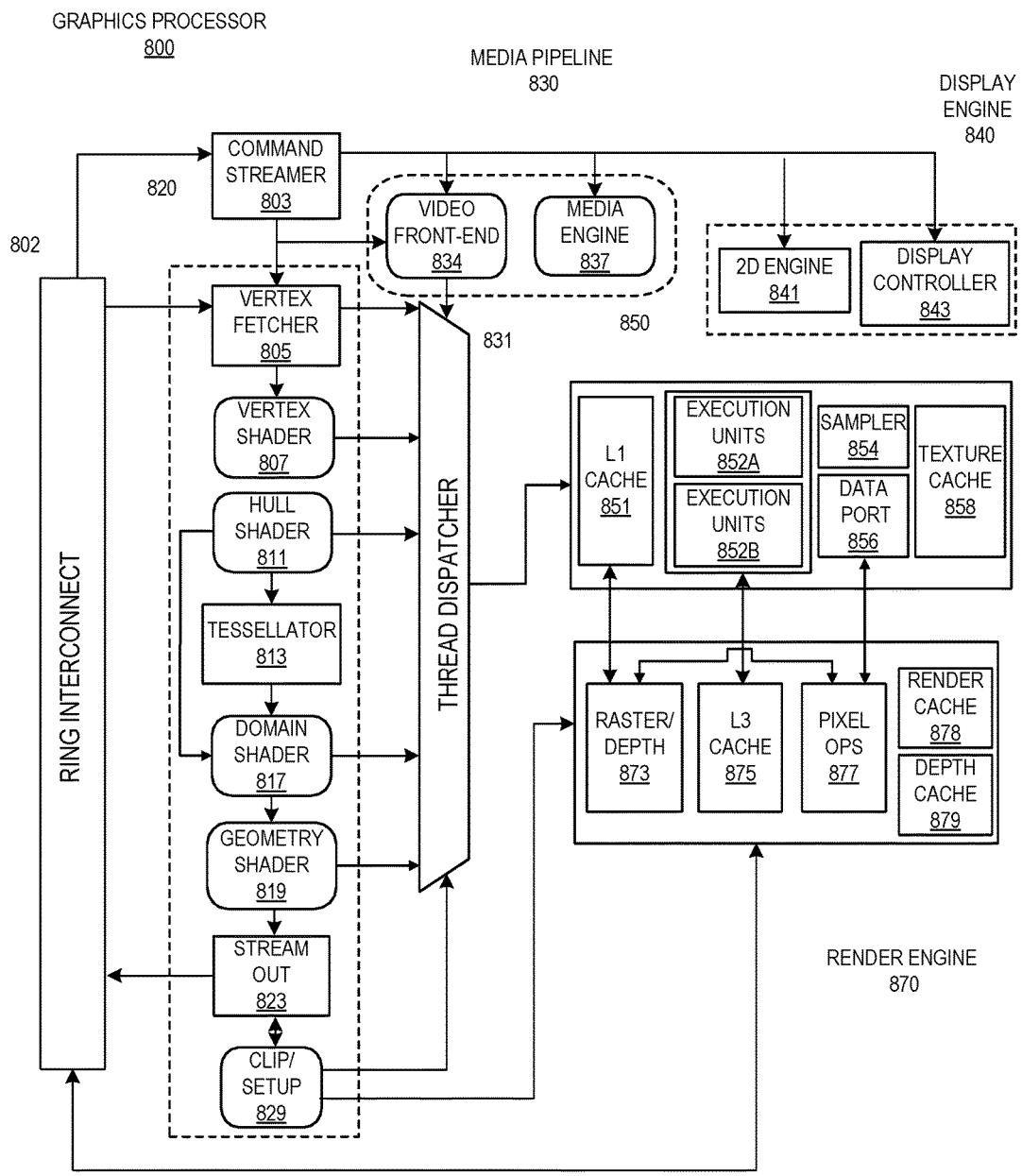
FIG. 8 illustrates a block diagram of a graphics processor, according to another embodiment.

FIG. 8 is a block diagram of another embodiment of a graphics processor 800. Elements of FIG. 8 having the same reference numbers (or names) as the elements of any other figure herein can operate or function in any manner similar to that described elsewhere herein, but are not limited to such.

In some embodiments, graphics processor 800 includes a graphics pipeline 820, a media pipeline 830, a display engine 840, thread execution logic 850, and a render output pipeline 870. In some embodiments, graphics processor 800 is a graphics processor within a multi-core processing system that includes one or more general purpose processing cores. The graphics processor is controlled by register writes to one or more control registers (not shown) or via commands issued to graphics processor 800 via a ring interconnect 802. In some embodiments, ring interconnect 802 couples graphics processor 800 to other processing components, such as other graphics processors or general-purpose processors. Commands from ring interconnect 802 are interpreted by a command streamer 803, which supplies instructions to individual components of graphics pipeline 820 or media pipeline 830.

In some embodiments, command streamer 803 directs the operation of a vertex fetcher 805 that reads vertex data from memory and executes vertex-processing commands provided by command streamer 803. In some embodiments, vertex fetcher 805 provides vertex data to a vertex shader 807, which performs coordinate space transformation and lighting operations to each vertex. In some embodiments, vertex fetcher 805 and vertex shader 807 execute vertex-processing instructions by dispatching execution threads to execution units 852A, 852B via a thread dispatcher 831.

In some embodiments, execution units 852A, 852B are an array of vector processors having an instruction set for performing graphics and media operations. In some embodiments, execution units 852A, 852B have an attached L1 cache 851 that is specific for each array or shared between the arrays. The cache can be configured as a data cache, an instruction cache, or a single cache that is partitioned to contain data and instructions in different partitions.

In some embodiments, graphics pipeline 820 includes tessellation components to perform hardware-accelerated tessellation of 3D objects. In some embodiments, a programmable hull shader 811 configures the tessellation operations. A programmable domain shader 817 provides back-end evaluation of tessellation output. A tessellator 813 operates at the direction of hull shader 811 and contains special purpose logic to generate a set of detailed geometric objects based on a coarse geometric model that is provided as input to graphics pipeline 820. In some embodiments, if tessellation is not used, tessellation components 811, 813, 817 can be bypassed.

In some embodiments, complete geometric objects can be processed by a geometry shader 819 via one or more threads dispatched to execution units 852A, 852B, or can proceed directly to the clipper 829. In some embodiments, the geometry shader operates on entire geometric objects, rather than vertices or patches of vertices as in previous stages of the graphics pipeline. If the tessellation is disabled the geometry shader 819 receives input from the vertex shader 807. In some embodiments, geometry shader 819 is programmable by a geometry shader program to perform geometry tessellation if the tessellation units are disabled.

Before rasterization, a clipper 829 processes vertex data. The clipper 829 may be a fixed function clipper or a programmable clipper having clipping and geometry shader functions. In some embodiments, a rasterizer and depth test component 873 in the render output pipeline 870 dispatches pixel shaders to convert the geometric objects into their per pixel representations. In some embodiments, pixel shader logic is included in thread execution logic 850. In some embodiments, an application can bypass the rasterizer and depth test component 873 and access un-rasterized vertex data via a stream out unit 823.

The graphics processor 800 has an interconnect bus, interconnect fabric, or some other interconnect mechanism that allows data and message passing amongst the major components of the processor. In some embodiments, execution units 852A, 852B and associated cache(s) 851, texture and media sampler 854, and texture/sampler cache 858 interconnect via a data port 856 to perform memory access and communicate with render output pipeline components of the processor. In some embodiments, sampler 854, caches 851, 858 and execution units 852A, 852B each have separate memory access paths.

In some embodiments, render output pipeline 870 contains a rasterizer and depth test component 873 that converts vertex-based objects into an associated pixel-based representation. In some embodiments, the rasterizer logic includes a windower/masker unit to perform fixed function triangle and line rasterization. An associated render cache 878 and depth cache 879 are also available in some embodiments. A pixel operations component 877 performs pixel-based operations on the data, though in some instances, pixel operations associated with 2D operations (e.g. bit block image transfers with blending) are performed by the 2D engine 841, or substituted at display time by the display controller 843 using overlay display planes. In some embodiments, a shared L3 cache 875 is available to all graphics components, allowing the sharing of data without the use of main system memory.

In some embodiments, graphics processor media pipeline 830 includes a media engine 837 and a video front end 834. In some embodiments, video front end 834 receives pipeline commands from the command streamer 803. In some embodiments, media pipeline 830 includes a separate command streamer. In some embodiments, video front-end 834 processes media commands before sending the command to the media engine 837. In some embodiments, media engine 337 includes thread spawning functionality to spawn threads for dispatch to thread execution logic 850 via thread dispatcher 831.

In some embodiments, graphics processor 800 includes a display engine 840. In some embodiments, display engine 840 is external to processor 800 and couples with the graphics processor via the ring interconnect 802, or some other interconnect bus or fabric. In some embodiments, display engine 840 includes a 2D engine 841 and a display controller 843. In some embodiments, display engine 840 contains special purpose logic capable of operating independently of the 3D pipeline. In some embodiments, display controller 843 couples with a display device (not shown), which may be a system integrated display device, as in a laptop computer, or an external display device attached via a display device connector.

In some embodiments, graphics pipeline 820 and media pipeline 830 are configurable to perform operations based on multiple graphics and media programming interfaces and are not specific to any one application programming interface (API). In some embodiments, driver software for the graphics processor translates API calls that are specific to a particular graphics or media library into commands that can be processed by the graphics processor. In some embodiments, support is provided for the Open Graphics Library (OpenGL) and Open Computing Language (OpenCL) from the Khronos Group, the Direct3D library from the Microsoft Corporation, or support may be provided to both OpenGL and D3D. Support may also be provided for the Open Source Computer Vision Library (OpenCV). A future API with a compatible 3D pipeline would also be supported if a mapping can be made from the pipeline of the future API to the pipeline of the graphics processor.

FIG. 9A is a block diagram illustrating a graphics processor command format 900 according to some embodiments. FIG. 9B is a block diagram illustrating a graphics processor command sequence 910 according to an embodiment. The solid lined boxes in FIG. 9A illustrate the components that are generally included in a graphics command while the dashed lines include components that are optional or that are only included in a sub-set of the graphics commands. The exemplary graphics processor command format 900 of FIG. 9A includes data fields to identify a target client 902 of the command, a command operation code (opcode) 904, and the relevant data 906 for the command. A sub-opcode 905 and a command size 908 are also included in some commands.

In some embodiments, client 902 specifies the client unit of the graphics device that processes the command data. In some embodiments, a graphics processor command parser examines the client field of each command to condition the further processing of the command and route the command data to the appropriate client unit. In some embodiments, the graphics processor client units include a memory interface unit, a render unit, a 2D unit, a 3D unit, and a media unit. Each client unit has a corresponding processing pipeline that processes the commands. Once the command is received by the client unit, the client unit reads the opcode 904 and, if present, sub-opcode 905 to determine the operation to perform. The client unit performs the command using information in data field 906. For some commands an explicit command size 908 is expected to specify the size of the command. In some embodiments, the command parser automatically determines the size of at least some of the commands based on the command opcode. In some embodiments commands are aligned via multiples of a double word.

The flow diagram in FIG. 9B shows an exemplary graphics processor command sequence 910. In some embodiments, software or firmware of a data processing system that features an embodiment of a graphics processor uses a version of the command sequence shown to set up, execute, and terminate a set of graphics operations. A sample command sequence is shown and described for purposes of example only as embodiments are not limited to these specific commands or to this command sequence. Moreover, the commands may be issued as batch of commands in a command sequence, such that the graphics processor will process the sequence of commands in at least partially concurrence.

In some embodiments, the graphics processor command sequence 910 may begin with a pipeline flush command 912 to cause any active graphics pipeline to complete the currently pending commands for the pipeline. In some embodiments, the 3D pipeline 922 and the media pipeline 924 do not operate concurrently. The pipeline flush is performed to cause the active graphics pipeline to complete any pending commands. In response to a pipeline flush, the command parser for the graphics processor will pause command processing until the active drawing engines complete pending operations and the relevant read caches are invalidated. Optionally, any data in the render cache that is marked 'dirty' can be flushed to memory. In some embodiments, pipeline flush command 912 can be used for pipeline synchronization or before placing the graphics processor into a low power state.

In some embodiments, a pipeline select command 913 is used when a command sequence requires the graphics processor to explicitly switch between pipelines. In some embodiments, a pipeline select command 913 is required only once within an execution context before issuing pipeline commands unless the context is to issue commands for both pipelines. In some embodiments, a pipeline flush command is 912 is required immediately before a pipeline switch via the pipeline select command 913.

In some embodiments, a pipeline control command 914 configures a graphics pipeline for operation and is used to program the 3D pipeline 922 and the media pipeline 924. In some embodiments, pipeline control command 914 configures the pipeline state for the active pipeline. In one embodiment, the pipeline control command 914 is used for pipeline synchronization and to clear data from one or more cache memories within the active pipeline before processing a batch of commands.

In some embodiments, return buffer state commands 916 are used to configure a set of return buffers for the respective pipelines to write data. Some pipeline operations require the allocation, selection, or configuration of one or more return buffers into which the operations write intermediate data during processing. In some embodiments, the graphics processor also uses one or more return buffers to store output data and to perform cross thread communication. In some embodiments, the return buffer state 916 includes selecting the size and number of return buffers to use for a set of pipeline operations.

The remaining commands in the command sequence differ based on the active pipeline for operations. Based on a pipeline determination 920, the command sequence is tailored to the 3D pipeline 922 beginning with the 3D pipeline state 930, or the media pipeline 924 beginning at the media pipeline state 940.

The commands for the 3D pipeline state 930 include 3D state setting commands for vertex buffer state, vertex element state, constant color state, depth buffer state, and other state variables that are to be configured before 3D primitive commands are processed. The values of these commands are determined at least in part based the particular 3D API in use. In some embodiments, 3D pipeline state 930 commands are also able to selectively disable or bypass certain pipeline elements if those elements will not be used.

In some embodiments, 3D primitive 932 command is used to submit 3D primitives to be processed by the 3D pipeline. Commands and associated parameters that are passed to the graphics processor via the 3D primitive 932 command are forwarded to the vertex fetch function in the graphics pipeline. The vertex fetch function uses the 3D primitive 932 command data to generate vertex data structures. The vertex data structures are stored in one or more return buffers. In some embodiments, 3D primitive 932 command is used to perform vertex operations on 3D primitives via vertex shaders. To process vertex shaders, 3D pipeline 922 dispatches shader execution threads to graphics processor execution units.

In some embodiments, 3D pipeline 922 is triggered via an execute 934 command or event. In some embodiments, a register write triggers command execution. In some embodiments execution is triggered via a 'go' or 'kick' command in the command sequence. In one embodiment command execution is triggered using a pipeline synchronization command to flush the command sequence through the graphics pipeline. The 3D pipeline will perform geometry processing for the 3D primitives. Once operations are complete, the resulting geometric objects are rasterized and the pixel engine colors the resulting pixels. Additional commands to control pixel shading and pixel back end operations may also be included for those operations.

In some embodiments, the graphics processor command sequence 910 follows the media pipeline 924 path when performing media operations. In general, the specific use and manner of programming for the media pipeline 924 depends on the media or compute operations to be performed. Specific media decode operations may be offloaded to the media pipeline during media decode. In some embodiments, the media pipeline can also be bypassed and media decode can be performed in whole or in part using resources provided by one or more general purpose processing cores. In one embodiment, the media pipeline also includes elements for general-purpose graphics processor unit (GPGPU) operations, where the graphics processor is used to perform SIMD vector operations using computational shader programs that are not explicitly related to the rendering of graphics primitives.

In some embodiments, media pipeline 924 is configured in a similar manner as the 3D pipeline 922. A set of media pipeline state commands 940 are dispatched or placed into in a command queue before the media object commands 942. In some embodiments, media pipeline state commands 940 include data to configure the media pipeline elements that will be used to process the media objects. This includes data to configure the video decode and video encode logic within the media pipeline, such as encode or decode format. In some embodiments, media pipeline state commands 940 also support the use one or more pointers to "indirect" state elements that contain a batch of state settings.

In some embodiments, media object commands 942 supply pointers to media objects for processing by the media pipeline. The media objects include memory buffers containing video data to be processed. In some embodiments, all media pipeline states must be valid before issuing a media object command 942. Once the pipeline state is configured and media object commands 942 are queued, the media pipeline 924 is triggered via an execute command 944 or an equivalent execute event (e.g., register write). Output from media pipeline 924 may then be post processed by operations provided by the 3D pipeline 922 or the media pipeline 924. In some embodiments, GPGPU operations are configured and executed in a similar manner as media operations.

FIG. 10 illustrates exemplary graphics software architecture for a data processing system 1000 according to some embodiments. In some embodiments, software architecture includes a 3D graphics application 1010, an operating system 1020, and at least one processor 1030. In some embodiments, processor 1030 includes a graphics processor 1032 and one or more general-purpose processor core(s) 1034. The graphics application 1010 and operating system 1020 each execute in the system memory 1050 of the data processing system.

In some embodiments, 3D graphics application 1010 contains one or more shader programs including shader instructions 1612. The shader language instructions may be in a high-level shader language, such as the High Level Shader Language (HLSL) or the OpenGL Shader Language (GLSL). The application also includes executable instructions 1614 in a machine language suitable for execution by the general-purpose processor core 1034. The application also includes graphics objects 1616 defined by vertex data.

In some embodiments, operating system 1020 is a Microsoft® Windows® operating system from the Microsoft Corporation, a proprietary UNIX-like operating system, or an open source UNIX-like operating system using a variant of the Linux kernel. When the Direct3D API is in use, the operating system 1020 uses a front-end shader compiler 1024 to compile any shader instructions 1612 in HLSL into a lower-level shader language. The compilation may be a just-in-time (JIT) compilation or the application can perform shader pre-compilation. In some embodiments, high-level shaders are compiled into low-level shaders during the compilation of the 3D graphics application 1010.

In some embodiments, user mode graphics driver 1026 contains a back-end shader compiler 1027 to convert the shader instructions 1612 into a hardware specific representation. When the OpenGL API is in use, shader instructions 1612 in the GLSL high-level language are passed to a user mode graphics driver 1026 for compilation. In some embodiments, user mode graphics driver 1026 uses operating system kernel mode functions 1028 to communicate with a kernel mode graphics driver 1029. In some embodiments, kernel mode graphics driver 1029 communicates with graphics processor 1032 to dispatch commands and instructions.

One or more aspects of at least one embodiment may be implemented by representative code stored on a machine-readable medium, which represents and/or defines logic within an integrated circuit such as a processor. For example, the machine-readable medium may include instructions, which represent logic within the processor. When read by a machine, the instructions may cause the machine to fabricate the logic to perform the techniques described herein. Such representations, known as "IP cores," are reusable units of logic for an integrated circuit that may be stored on a tangible, machine-readable medium as a hardware model that describes the structure of the integrated circuit. The hardware model may be supplied to various customers or manufacturing facilities, which load the hardware model on fabrication machines that manufacture the integrated circuit. The integrated circuit may be fabricated such that the circuit performs operations described in association with any of the embodiments described herein.

Figure 11:
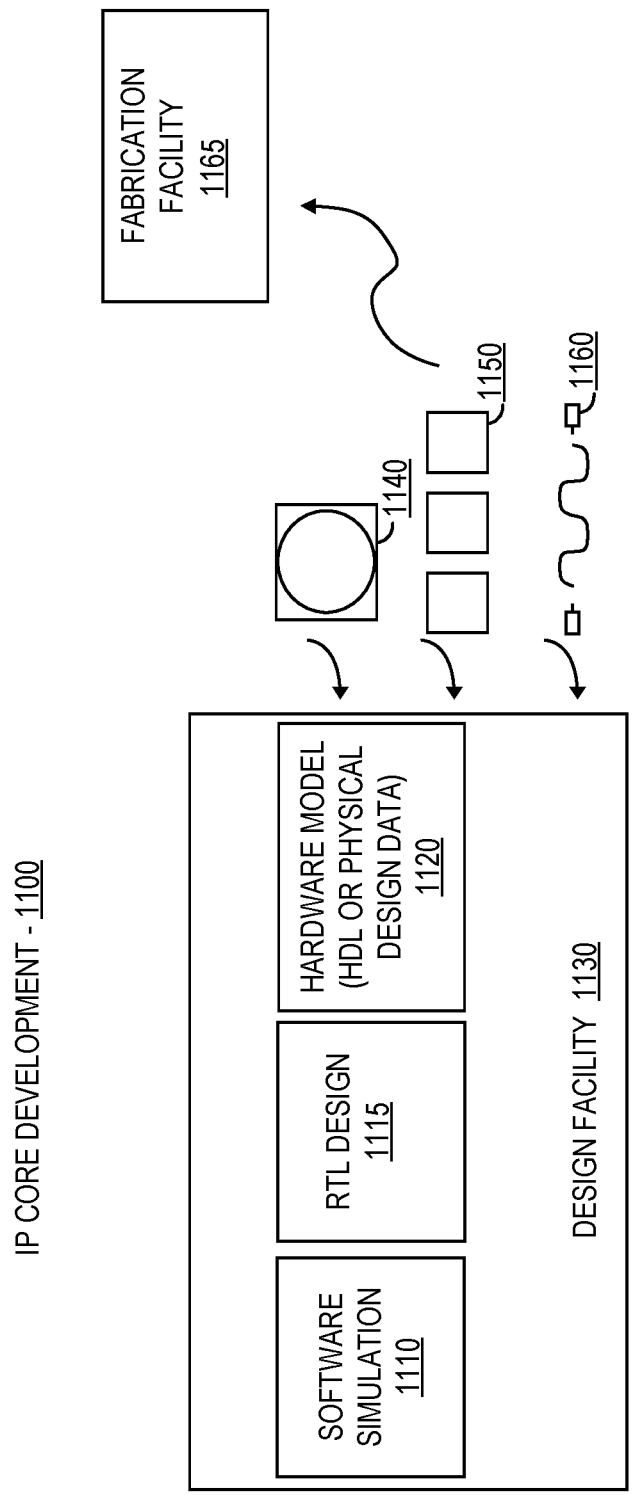
FIG. 11 illustrates a block diagram of an IP core development system, according to an embodiment.

FIG. 11 is a block diagram illustrating an IP core development system 1100 that may be used to manufacture an integrated circuit to perform operations according to an embodiment. The IP core development system 1100 may be used to generate modular, re-usable designs that can be incorporated into a larger design or used to construct an entire integrated circuit (e.g., an SOC integrated circuit). A design facility 1730 can generate a software simulation 1710 of an IP core design in a high level programming language (e.g., C/C++). The software simulation 1710 can be used to design, test, and verify the behavior of the IP core. A register transfer level (RTL) design can then be created or synthesized from the simulation model 1100. The RTL design 1115 is an abstraction of the behavior of the integrated circuit that models the flow of digital signals between hardware registers, including the associated logic performed using the modeled digital signals. In addition to an RTL design 1115, lower-level designs at the logic level or transistor level may also be created, designed, or synthesized. Thus, the particular details of the initial design and simulation may vary.

The RTL design 1115 or equivalent may be further synthesized by the design facility into a hardware model 1120, which may be in a hardware description language (HDL), or some other representation of physical design data. The HDL may be further simulated or tested to verify the IP core design. The IP core design can be stored for delivery to a $3^{rd}$ party fabrication facility 1165 using non-volatile memory 1140 (e.g., hard disk, flash memory, or any non-volatile storage medium). Alternatively, the IP core design may be transmitted (e.g., via the Internet) over a wired connection 1150 or wireless connection 1160. The fabrication facility 1165 may then fabricate an integrated circuit that is based at least in part on the IP core design. The fabricated integrated circuit can be configured to perform operations in accordance with at least one embodiment described herein.

Figure 12:
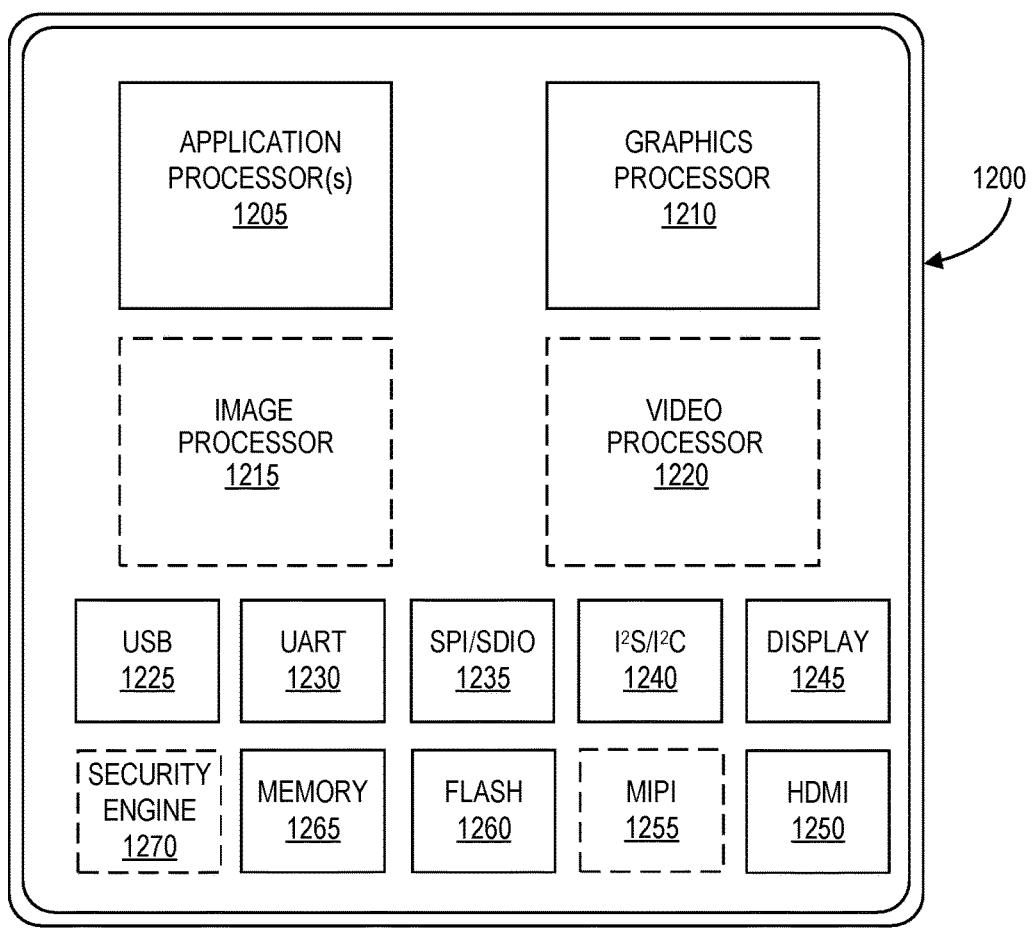
FIG. 12 illustrates a block diagram of a system-on-a-chip (SoC) integrated circuit, according to an embodiment.

FIG. 12 is a block diagram illustrating an exemplary system on a chip integrated circuit 1200 that may be fabricated using one or more IP cores, according to an embodiment. The exemplary integrated circuit includes one or more application processors 1205 (e.g., CPUs), at least one graphics processor 1210, and may additionally include an image processor 1215 and/or a video processor 1220, any of which may be a modular IP core from the same or multiple different design facilities. The integrated circuit includes peripheral or bus logic including a USB controller 1225, UART controller 1230, an SPI/SDIO controller 1235, and an $I^2S/I^2C$ controller 1240. Additionally, the integrated circuit can include a display device 1245 coupled to one or more of a high-definition multimedia interface (HDMI) controller 1250 and a mobile industry processor interface (MIPI) display interface 1255. Storage may be provided by a flash memory subsystem 1260 including flash memory and a flash memory controller. Memory interface may be provided via a memory controller 1265 for access to SDRAM or SRAM memory devices. Some integrated circuits additionally include an embedded security engine 1270.

Additionally, other logic and circuits may be included in the processor of integrated circuit 1200, including additional graphics processors/cores, peripheral interface controllers, or general purpose processor cores.

Figure 13:
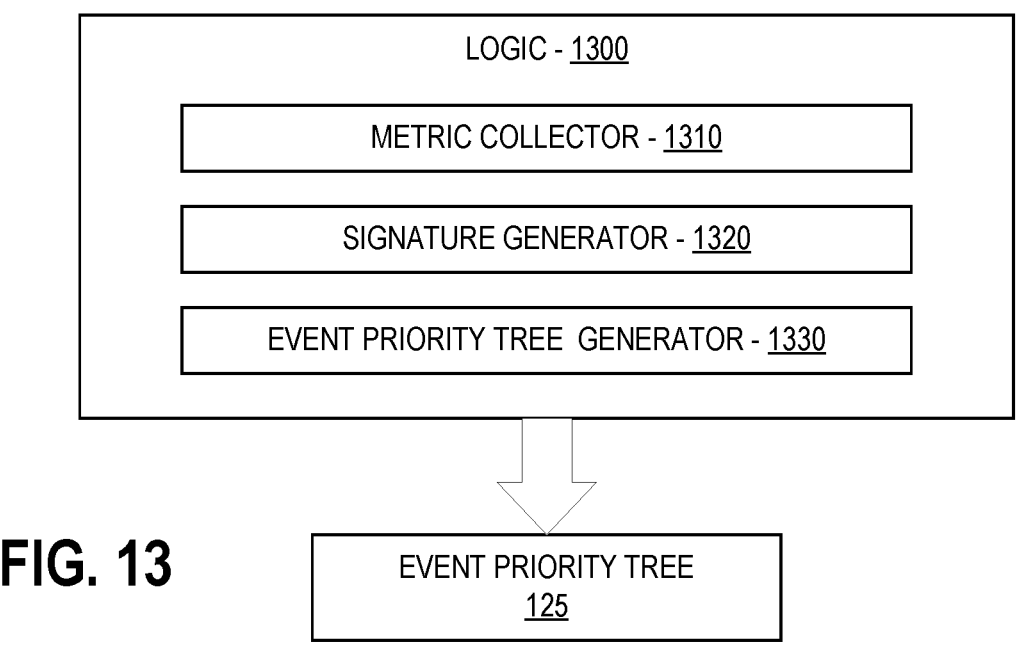
FIG. 13 illustrates a block diagram of hardware logic to generate an event priority tree, according to an embodiment.

FIG. 13 is a block diagram illustrating an exemplary hardware logic 1300 to generate an event priority tree to identify performance bottlenecks in a graphics workload. The logic 1300 comprises a metric collector 1310, a signature generator 1320, and an event priority tree generator 1330. In general, the logic 1300 may be operably coupled to a graphics processor (e.g., the graphics processor(s) 108 and/or the external graphics processor 112) and particularly to interfaces between EUs of the graphics processor (e.g., refer to FIG. 14).

The metric collector 1310 comprises logic to receive an indication of at least one metric for each of the plurality of events. In particular, the metric collector 1310 can repeatedly collect (e.g., identify, determine, sense, or the like) a number of different metrics. In some examples, the metrics can include a number of clock cycles needed to execute the event or a number of clock cycles between event changes. In some examples, the metrics can be values based on a time in clocks during execution of the workload. In some examples, the metrics can be values based on a target (e.g., render target, shader change, or the like) during execution of the workload. In some examples, the metrics can be values based on given instructions (e.g., clear, copy, update, dispatch, draw, dispatch, execute, or the like).

The signature generator can generate, for each event, a signature (e.g., refer to FIG. 15 and FIG. 18) indicative of a region of the graphics hardware or an architectural block of the graphics hardware limiting performance of the event. These regions are sometimes referred to as hotspots. In some examples, a hotspot can be determined based on performance indications for interfaces (e.g., refer to FIG. 14) between architectural blocks of the graphics hardware. In some examples, the performance indication includes a number of clock cycles data is ready over the interface, a number of clock cycles data is refused over the interface, or a ratio of the number of clock cycles data is ready over a first interface over the number of clock cycles data is ready over a second interface.

In general, the event priority tree generator 1330 generates a prioritized list of events to be resolved to increase performance of the graphics workload. In particular, the event priority tree generator 1330 can generate the event priority tree 125 (e.g., refer to FIG. 16) including a prioritized listing of events.

The event priority tree generator 1330 can also generate a prioritized list of frames of events to resolve to increase performance of the graphics workload. In particular, the event priority tree generator 1330 can sort a number of frames based on a combined weight of events corresponding to the frame (e.g., refer to FIG. 17).

Figure 14:
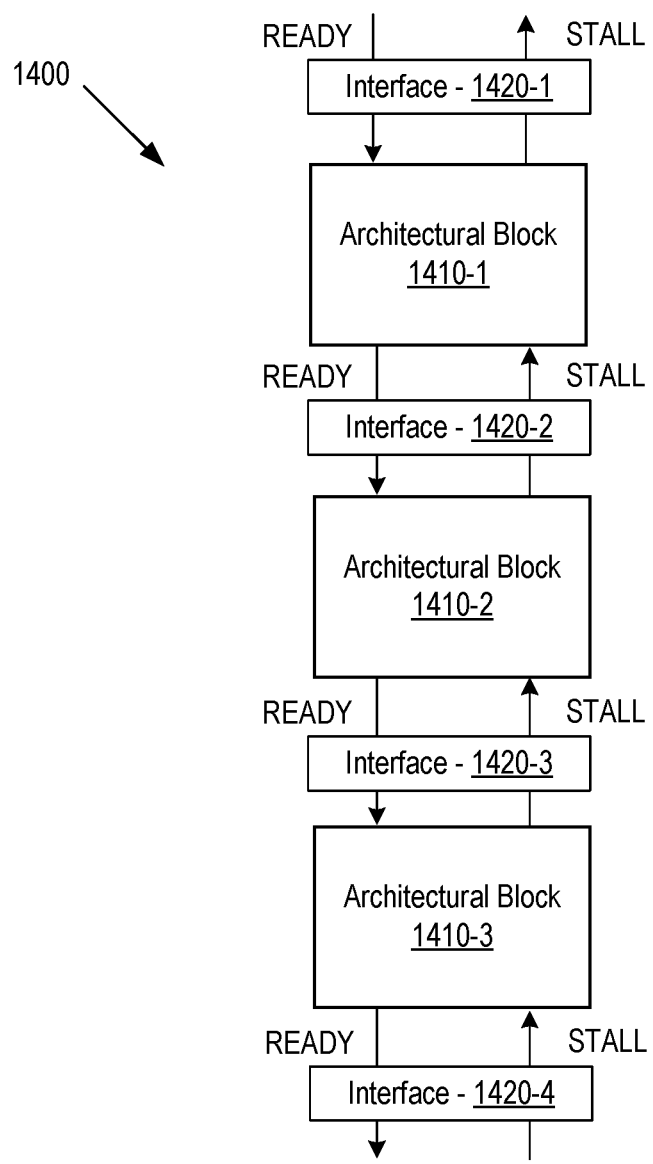
FIG. 14 illustrates a block diagram of a portion of a graphics processor, according to an embodiment.

FIG. 14 is a block diagram illustrating an exemplary portion of a graphics processor 1400. The graphics processor 1400 includes architectural blocks 1410 and interfaces 1420 between the architectural blocks. For example, architectural blocks 1410-1, 1410-2, and 1410-3 are depicted with interface 1420-1 operably coupled to architectural block 1410-1, interface 1420-2 operably coupling architectural block 1410-1 and 1410-2, interface 1420-3 operably coupling architectural block 1410-2 and 1410-3, and interface 1420-4 operably coupled to architectural block 1410-3. During operation, graphic workload data (e.g., primitives, instructions, or the like) may flow between architectural blocks 1410 via interfaces 1420.

The interfaces 1420 can be embodied as hardware metrics to be evaluated per event, per tuple (e.g., set of events sharing a similar state), and/or per pipeline state (e.g., render target, pipeline state object, or the like). The data flow through the interfaces 1420 can be quantified based on the state of the interface. In some examples, the state of the interfaces 1420 can be quantified based on a time over a threshold in which data is ready on the interface (e.g., clock cycles over threshold, or the like). In some examples, the state of the interfaces 1420 can be quantified based on a drop in time over a threshold in which data is ready on the interface (e.g., clock cycles below a threshold, or the like). In some examples, the state of the interfaces 1420 can be quantified based on throughput (e.g., a ratio of time data is ready on one interface (e.g., 1420-2) over time data is ready on an adjacent interface (e.g., 1420-3), or the like). In some examples, the state of the interfaces 1420 can be quantified based on a number of pixels per clock cycle written to the interface. In some examples, the state of the interfaces 1420 can be quantified based on identifying a known bad data pattern, or the like.

FIG. 15 is a block diagram illustrating an exemplary event description table 1500. In some examples, the signature generator 1320 can generate an event description table including indications of events for a graphics workload and signatures and weights corresponding to the events. For example, the signature generator 1320 may identify events 1510 as described herein. The events 1510 can be indicated in the event description table 1500, or an information element including indications of signatures 1520, hashes 1530, and a weight 1540.

In general, the signatures 1520 indicate portions of the graphics hardware in which a bottleneck occurs or in which optimization of the graphics workload may increase efficiency. Example generation of signatures 1520 is given below with respect to FIG. 18. In general however, for each event 1510, architectural blocks 1410 are evaluated from downstream to upstream. Hotspots or bottlenecks downstream of the architectural blocks will stall upstream blocks.

The hashes 1530 can correspond to a variety of different shaders, for example, vertex shaders, geometry shaders, pixel shaders, fragment shaders, depth shaders, or the like. In some examples, the weight 1540 can be the cycle count (e.g., clock cycle count, or the like) of the event over a frame, over all frames, over a subset of frames, or the like.

For example, the event description table 1500 includes five events 1510-1, 1510-2, 1510-2, 1510-4, and 1510-5. It is to be appreciated that the number of events is depicted at a quantity to facilitate understanding and provide clarity. However, during practice many hundreds, thousands, hundreds of thousands, or the like events may be represented and sorted as described herein. Examples are not limited in this context.

The event 1510-1 is depicted having signature 1520-1, hashes 1530-1, and weight 1540-1. The event 1510-2 is depicted having signature 1520-2, hashes 1530-2, and weight 1540-2. The event 1510-3 is depicted having signature 1520-3, hashes 1530-3, and weight 1540-3. The event 1510-4 is depicted having signature 1520-4, hashes 1530-4, and weight 1540-4. The event 1510-5 is depicted having signature 1520-5, hashes 1530-5, and weight 1540-5.

Figure 16:
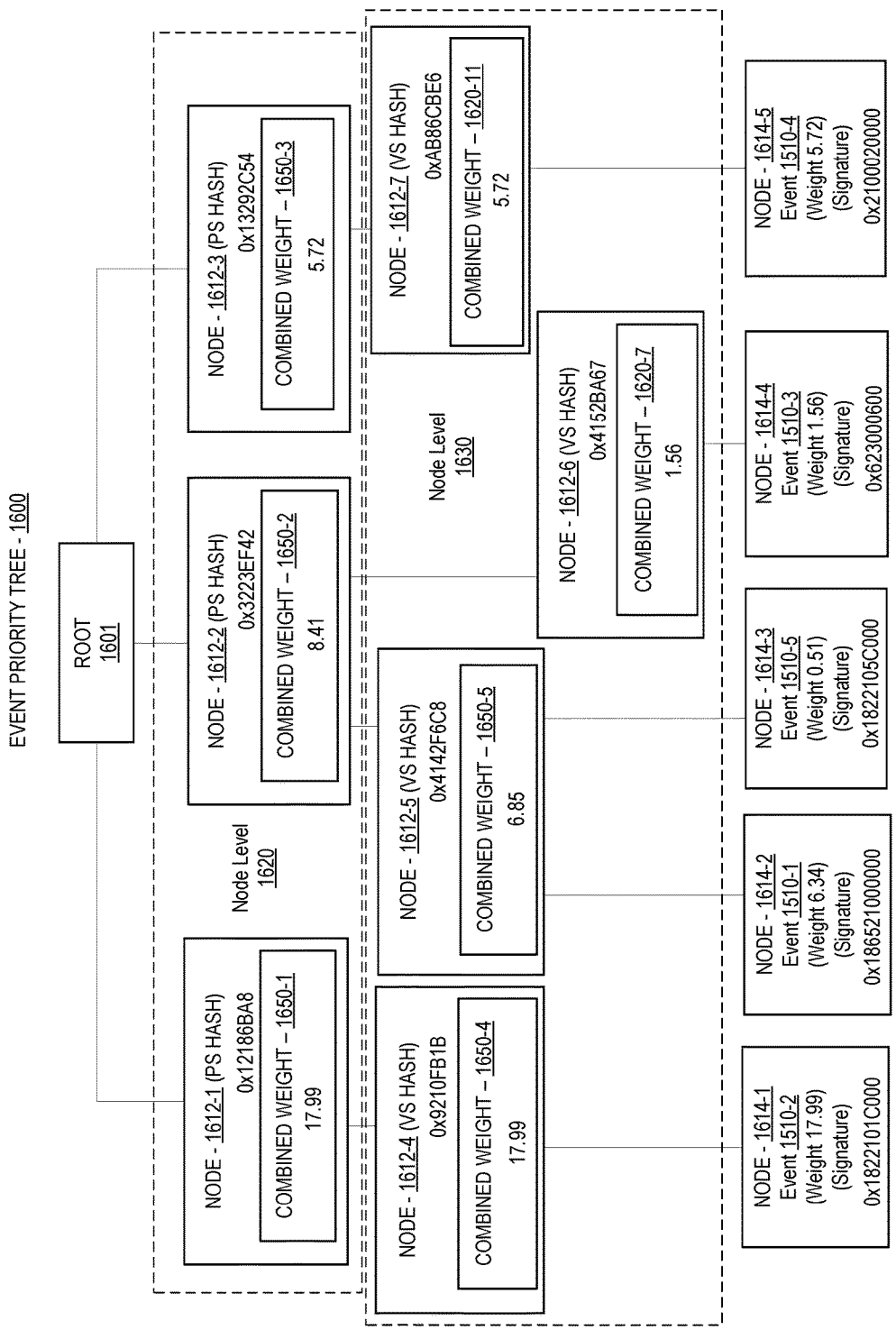
FIG. 16 illustrates a block diagram of an event priority tree, according to an embodiment.

The event priority tree generator 1330 can generate the event priority tree 125 from the events 1510 of the event description table 1500. FIG. 16 is a block diagram illustrating an exemplary event priority tree 1600. The event priority tree 1600 can be generated from events, such as, events 1510. The event priority tree 1600 is described with reference to the events 1510 of FIG. 15. However, it is worthy to note this is done for purposes of convenience and clarity and not to be limiting.

The event priority tree 1600 includes nodes organized under a root 1601. The nodes may be either parent nodes 1612 or leaf nodes 1614. Each of the leaf nodes 1614 may correspond to a one of the events 1510. For example, leaf nodes 1614-1 to 1614-5 correspond to events 1510-1 to 1510-5. In particular, leaf node 1614-1 may correspond to event 1510-2; leaf node 1614-2 may correspond to event 1510-1; leaf node 1614-3 may correspond to event 1510-5; leaf node 1614-4 may correspond to event 1510-3; and leaf node 1614-5 may correspond to event 1510-4.

In general, the event priority tree generator 1330 can organize the leaf nodes 1614 under any combination of parent nodes 1612 by forming parent nodes for various characteristics (e.g. hashes 1530, or the like) of the events 1510. Furthermore, multiple levels of parent nodes 1612 can be formed. For example, the event priority tree 1600 includes a parent node level 1620 and a parent node level 1630. Where the first parent node level 1620 is under the root 1601 and the second parent node level 1630 is under the first parent node level 1620.

Each level of parent nodes can include a parent node 1612 corresponding to group or "bucket" of similarly characterized events 1510. For example, the parent node level 1620 include parent nodes 1612-1, 1612-2, and 1612-3, with each parent node 1612-1 to 1612-3 corresponding to a particular pixel hash. For example, the parent node 1610-1 can correspond to events having a first pixel hash (e.g., 0x12186BA8, or the like) while the parent node 1610-2 can correspond to events having a second pixel hash (e.g., 0x3223EF42, or the like) and the parent node 1610-3 can correspond to events having a third pixel hash (e.g., 0x13292C54, or the like).

The parent node level 1630 include parent nodes 1612-4, 1612-5, 1612-6 and 1612-7, with each parent node 1612-4 to 1612-7 corresponding to a particular vertex hash. For example, the parent node 1610-4 can correspond to events having a first vertex hash (e.g., 0x9210FB1B, or the like); the parent node 1610-5 can correspond to events having a second vertex hash (e.g., 0x4142F6C8, or the like); the parent node 1610-6 can correspond to events having a third vertex hash (e.g., 0x4152BA67, or the like); and the parent node 1610-7 can correspond to events having a fourth vertex hash (e.g., 0xAB86CBE6, or the like).

The leaf nodes 1614 are then organized under parent nodes in the lower level of parent nodes (e.g., the parent nodes in level 1630, or the like) based on the particular characteristic (e.g., vertex hash and pixel hash, or the like) of the respective events. For example, the leaf node 1614-1 corresponding to event 1510-2 is organized under the parent nodes 1612-4 and 1612-1 as the event 1510-2 has the same vertex hash and pixel hash to which these respective parent nodes correspond. Likewise for the other leaf nodes in the event priority tree.

Each leaf node may have a weight 1540, corresponding to the weight 1540 of the event 1510 to which the leaf node 1614 corresponds. For example, the leaf node 1614-1 may have weight 1540-2, corresponding to the event 1510-2.

Each parent node may have a combined weight 1650, corresponding to a weight of all nodes under that parent node. For example, the parent node 1612-4 may have a combined weight 1650-4 corresponding to the weight 1510-2 of the leaf node 1612-1. As another example, the parent node 1612-5 may have a combined weight 1650-5 corresponding to a sum of the weights of the leaf nodes 1614-2 and 1614-3. Additionally, the parent node 1612-2 may have a combined weight 1650-2 corresponding to the combined weights 1650-5 and 1650-6 of the parent nodes 1612-5 and 1612-6, which are under the parent node 1612-2.

The parent nodes 1612 and leaf nodes 1614 can be sorted based on the weight and combined weights to indicate events 1510 (and corresponding signatures 1520) that if resolved may have the largest impact of performance of the graphics workload and graphics hardware.

It is worthy to note, that the event priority tree 1600 is given as an example only and not to be limiting. In particular, the parent nodes can be organized based on any of a variety of different hashes or characteristics of the events. Furthermore, in some examples, the event priority tree can be based on global events, or more particularly, events over a number of frames of a graphics workload. Frames can be sorted based on a global weight of each frame. For example, FIG. 17 is a block diagram illustrating an exemplary set of sorted frames 1700. The sorted frames 1700 can be sorted based on a global weight of all top level parent nodes (e.g., 1612-1 to 1612-3, or the like) in each respective frame. The set of sorted frames 1700 is described with reference to the parent nodes 1612 and events 1510 of FIG. 16. However, it is worthy to note this is done for purposes of convenience and clarity and not to be limiting.

The set of sorted frames 1700 includes frames 1710. In particular, the frames 1710-1, 1710-2, and 1710-3 are depicted. It is worthy to note, that the number of frames are depicted at a quantity to facilitate understanding and not to be limiting. In particular, during practice, the set of sorted frames 1700 may include a number of frames greater than depicted here. Additionally, the frames 1710 are discussed with respect to the nodes 1612 of FIG. 16. However this is done for convenience and to to be limiting.

The set of sorted frames 1710-1 include a global weight 1720, representative of the sum of the weights of each node associated with a particular frame. For example, the frame 1710-1 is depicted associated with nodes 1612-1 and 1612-2; the frame 1710-2 is depicted associated with nodes 1612-2 and 1612-3; and the frame 1710-3 is depicted associated with the nodes 1612-1 and 1612-2. It is worthy to note, that the frames 1710 can be sorted based on any of the nodes 1612 and/or 1614. In particular, with some examples (e.g., refer to FIG. 17) the frames 1710 can be sorted based on the top level (e.g., the node level 1620) nodes while in other examples the frames 1710 can be sorted based on lower level (e.g., the node level 1630, or the like) or even leaf nodes (e.g., nodes 1614, or the like). Examples are not limited in this context.

A global weight can be determined for each of the frames based on the combined weight of each node associated with the frames. For example, the frame 1710-1 has a global weight 1720-1 of 26.40 (e.g., the sum of the combined weights 1650-1 and 1650-2); the frame 1710-2 has a global weight 1720-2 of 14.13 (e.g., the sum of the combined weights 1650-2 and 1650-3); and the frame 1710-3 has a global weight 1720-3 of 23.71 (e.g., the sum of the combined weights 1650-1 and 1650-3). The frames 1710 can be sorted based on their global weights 1750. For example, the set of sorted frames 1700 can be sorted as frame 1710-1, 1710-3, and 1710-2 (e.g., corresponding to a numeric sorting based on global weights 1750-1, 1750-3, and 1750-2).

Figure 18:
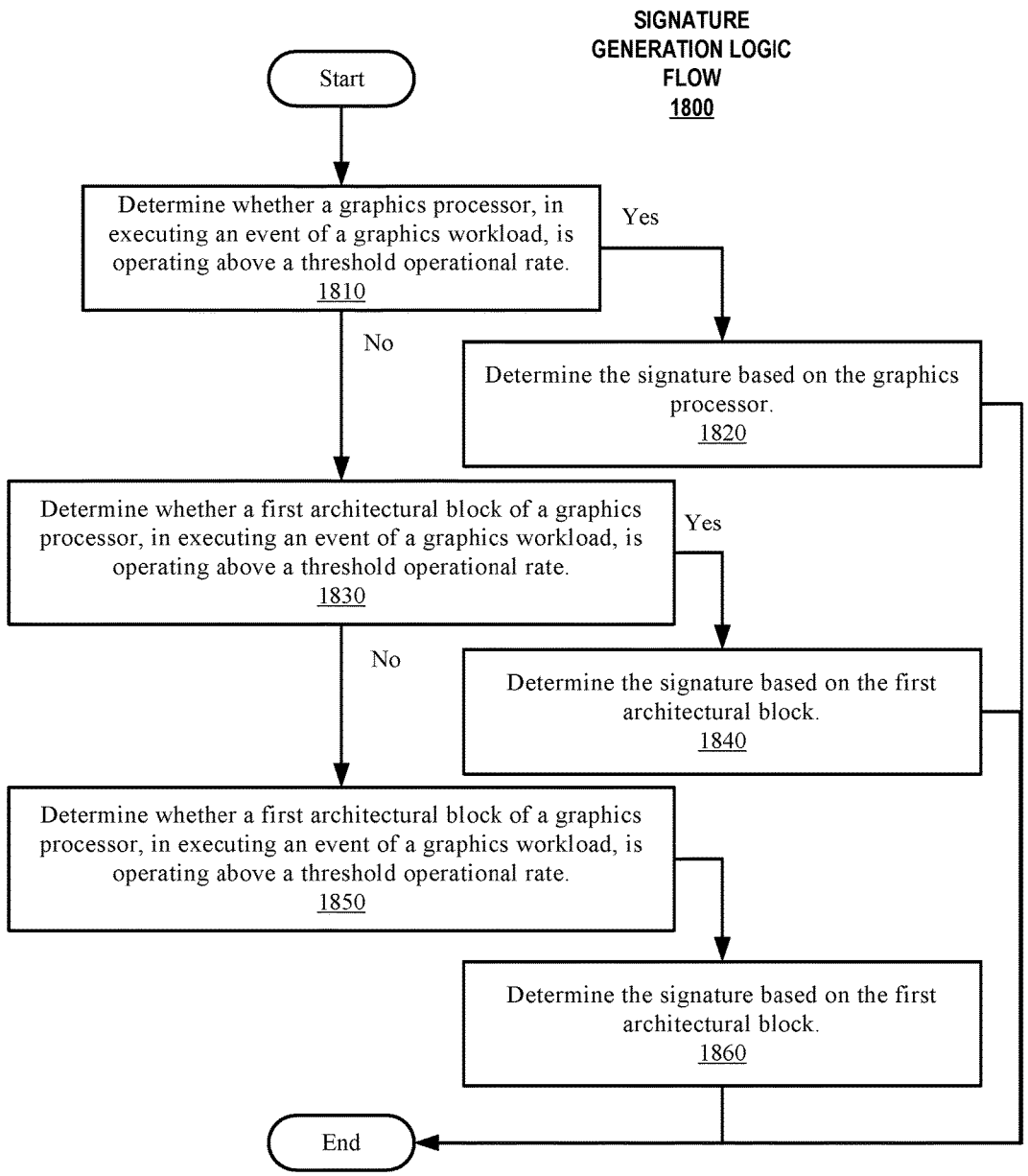
FIG. 18 illustrates a block diagram of a logic flow, according to an embodiment.

FIG. 18 illustrates a block diagram of a logic flow 1800, according to an embodiment. The logic flow 1800 may be representative of logic and/or features implemented by a processing unit, such as, the processor core(s) 107 in prioritizing events of a graphics workload as described herein. The logic flow 1800 may begin at block 1810. At block 1810 "determine whether a graphics processor, in executing an event of a graphics workload, is operating above a threshold operational rate," the metric collector 1310 may determine whether a graphics processor (e.g., the graphics processor(s) 108 and/or the external graphics processor 112, or the like), in executing a graphics workload (e.g., graphics workload data 122, or the like) is operating above a threshold operation rate.

From block 1810, the logic flow 1800 may continue to either block 1820 or block 1830. In particular, the logic flow 1800 may continue from block 1810 to block 1820 based on a determination that the graphics processor, in executing an event of a graphics workload, is operating above a threshold operational rate. Alternatively, logic flow 1800 may continue from block 1810 to block 1830 based on a determination that the graphics processor, in executing an event of a graphics workload, is not operating above a threshold operational rate.

At block 1820 "determine the signature based on the graphics processor" the signature generation unit 1320 can determine a signature (e.g., the signature 1520 of the event 1510, or the like) based on the graphics processor.

At block 1830 "determine whether a first architectural block of a graphics processor, in executing an event of a graphics workload, is operating above a threshold operational rate," the metric collection unit 1310 can determine whether a first architectural block is operating above or below an operational threshold. For example, the metric collection unit 1310 can determine whether memory bandwidth (e.g., based on memory interface 314, or the like) is constrained or causing latency based on the memory interface operating above a threshold level.

From block 1830, the logic flow 1800 may continue to either block 1840 or block 1850. In particular, the logic flow 1800 may continue from block 1830 to block 1840 based on a determination that the first architectural block of a graphics processor, in executing an event of a graphics workload, is operating above a threshold operational rate. Alternatively, logic flow 1800 may continue from block 1830 to block 1850 based on a determination that the first architectural block of a graphics processor, in executing an event of a graphics workload, is not operating above a threshold operational rate.

At block 1840 "determine the signature based on the first architectural block" the signature generation unit 1320 can determine a signature (e.g., the signature 1520 of the event 1510, or the like) based on the first architectural block.

At block 1850 "determine whether a second architectural block of a graphics processor, in executing an event of a graphics workload, is operating above a threshold operational rate," the metric collection unit 1310 can determine whether a second architectural block is operating above or below an operational threshold. For example, the metric collection unit 1310 can determine whether a color pipeline (e.g., 3D media sub-system 315, or the like) is saturated causing latency based on the color pipeline operating above a threshold level.

Continuing to block 1860 "determine the signature based on the first architectural block" the signature generation unit 1320 can determine a signature (e.g., the signature 1520 of the event 1510, or the like) based on the second architectural block.

It is worthy to note, that the logic flow 1800 may determine whether additional architectural blocks are operating above a threshold level and may determine a signature based on such determination. For example, the signature can be based on determining a bottleneck in a graphics hardware, in executing an event of a graphics workload by identifying the bottleneck from the end of the graphics pipeline to the beginning of the graphics pipeline. For example, a first architectural block could be a memory bandwidth (e.g., memory interface 314 at capacity); a second architectural block could be a color pipeline (e.g., 3D media engine 315); a third architectural block could be EU usage (e.g., all threads loaded into EUs 552, or the like); a fourth architectural block could be a memory subsystem (e.g., data cache 612 stalling, or the like); a fifth architectural block could be sampler streaming (e.g., samplers 554 streaming at capacity, or the like).

Figure 19:
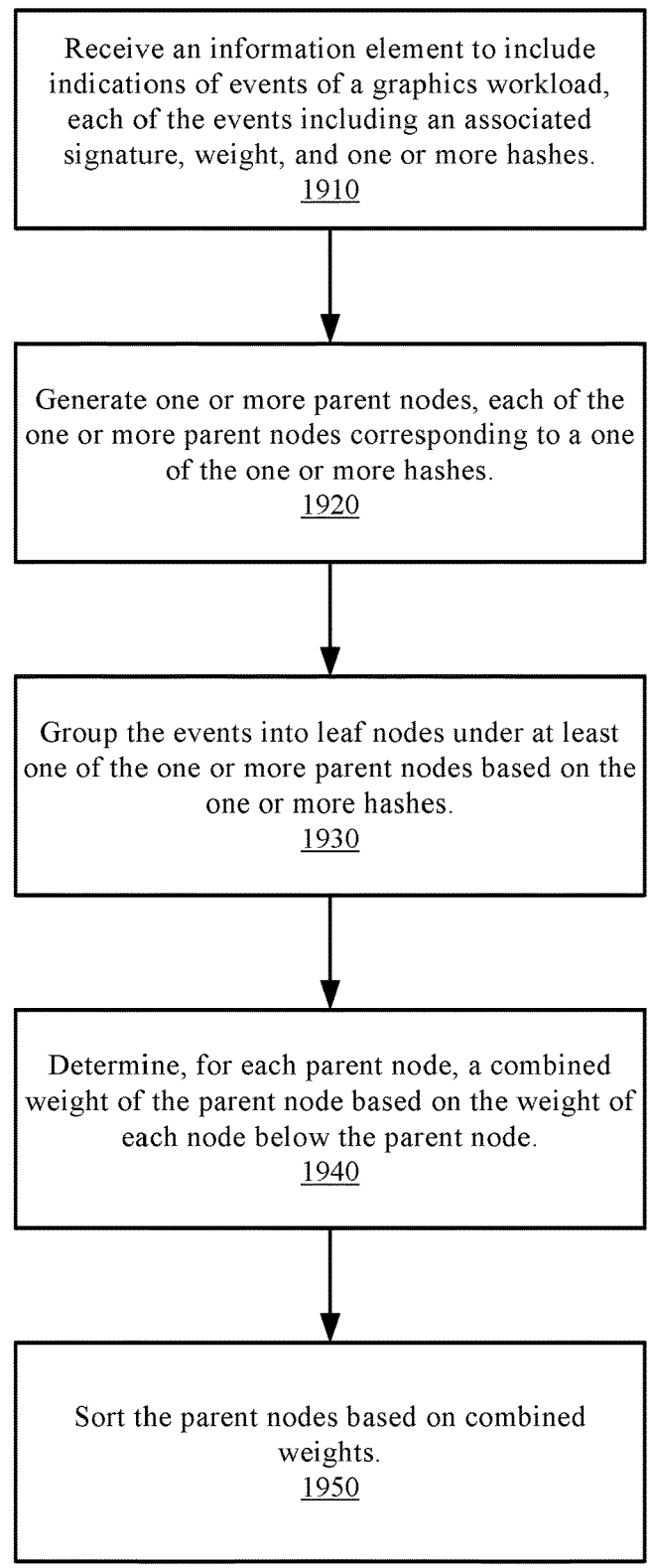
FIG. 19 illustrates a block diagram of a logic flow, according to an embodiment.

FIG. 19 illustrates a block diagram of a logic flow 1900, according to an embodiment. The logic flow 1900 may be representative of logic and/or features implemented by a processing unit, such as, the processor core(s) 107 in generating an event priority tree of a graphics workload as described herein. The logic flow 1900 may begin at block 1910. At block 1910 "receive an information element to include indications of events of a graphics workload, each of the events including an associated signature, weight, and one or more hashes," the event priority tree generator 1330 can receive an information element (e.g., the event table 1500, or the like) to include indications of events 1510. Each of the events 1510 including an associated signature 1520, hashes 1530, and a weight 1540.

Continuing to block 1920 "generate one or more parent nodes, each of the one or more parent nodes corresponding to a one of the one or more hashes," the event priority tree generator 1330 can generate one or more parent nodes 1612 corresponding to ones of the hashes 1530.

Continuing to block 1930 "group the events into leaf nodes under at least one of the one or more parent nodes based on the one or more hashes" the event priority tree generator 1330 can group the events 1510 into leaf nodes 1614 organized under the parent nodes 1612 based on the hashes 1530.

Continuing to block 1940 "determine, for each parent node, a combined weight of the parent node based on the weight of each node below the parent node" the event priority tree generator 1330 can determine, for each parent node 1612, a combined weight 1620 of the parent node 1612 based on the weights of all nodes (e.g., parent nodes 1612, leaf nodes 1614, etc.) under the parent node 1612.

Continuing to block 1950 "sort the parent nodes based on combined weights," the event priority tree generator can sort the nodes based on weight. For example, the parent nodes 1612 and leaf nodes 1614 can be sorted based on weight to form a tree (e.g., the tree 1600, or the like).

Figure 20:
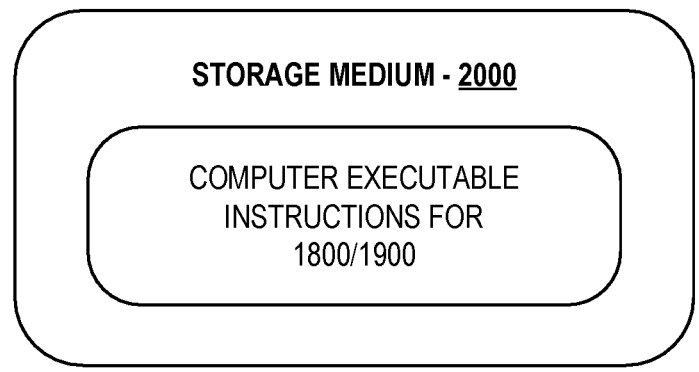
FIG. 20 illustrates a storage medium, according to an embodiment.

FIG. 20 illustrates a block diagram of a storage medium 2000, according to an embodiment. The storage medium 2000 may comprise an article of manufacture. In some examples, the storage medium 2000 may include any non-transitory computer readable medium or machine readable medium, such as an optical, magnetic or semiconductor storage. The storage medium 2000 may store various types of computer executable instructions, such as instructions to implement logic flow 1800 and/or logic flow 1900. Additionally, the storage medium 2000 may store an information element to include indications of the events (e.g., events represented in event table 1500, event priority tree 1600, and/or set of sorted frames 1700, or the like). Examples of a computer readable or machine readable storage medium may include any tangible media capable of storing electronic data, including volatile memory or non-volatile memory, removable or non-removable memory, erasable or non-erasable memory, writeable or re-writeable memory, and so forth. Examples of computer executable instructions may include any suitable type of code, such as source code, compiled code, interpreted code, executable code, static code, dynamic code, object-oriented code, visual code, and the like. The examples are not limited in this context.

To the extent various operations or functions are described herein, they can be described or defined as hardware circuitry, software code, instructions, configuration, and/or data. The content can be embodied in hardware logic, or as directly executable software ("object" or "executable" form), source code, high level shader code designed for execution on a graphics engine, or low level assembly language code in an instruction set for a specific processor or graphics core. The software content of the embodiments described herein can be provided via an article of manufacture with the content stored thereon, or via a method of operating a communication interface to send data via the communication interface.

A non-transitory machine readable storage medium can cause a machine to perform the functions or operations described, and includes any mechanism that stores information in a form accessible by a machine (e.g., computing device, electronic system, etc.), such as recordable/non-recordable media (e.g., read only memory (ROM), random access memory (RAM), magnetic disk storage media, optical storage media, flash memory devices, etc.). A communication interface includes any mechanism that interfaces to any of a hardwired, wireless, optical, etc., medium to communicate to another device, such as a memory bus interface, a processor bus interface, an Internet connection, a disk controller, etc. The communication interface is configured by providing configuration parameters or sending signals to prepare the communication interface to provide a data signal describing the software content. The communication interface can be accessed via one or more commands or signals sent to the communication interface.

Some embodiments may be described using the expression "one embodiment" or "an embodiment" along with their derivatives. These terms mean that a particular feature, structure, or characteristic described in connection with the embodiment is included in at least one embodiment. The appearances of the phrase "in one embodiment" in various places in the specification are not necessarily all referring to the same embodiment. Further, some embodiments may be described using the expression "coupled" and "connected" along with their derivatives. These terms are not necessarily intended as synonyms for each other. For example, some embodiments may be described using the terms "connected" and/or "coupled" to indicate that two or more elements are in direct physical or electrical contact with each other. The term "coupled," however, may also mean that two or more elements are not in direct contact with each other, but yet still co-operate or interact with each other. Furthermore, aspects or elements from different embodiments may be combined.

It is emphasized that the Abstract of the Disclosure is provided to allow a reader to quickly ascertain the nature of the technical disclosure. It is submitted with the understanding that it will not be used to interpret or limit the scope or meaning of the claims. In addition, in the foregoing Detailed Description, it can be seen that various features are grouped together in a single embodiment for the purpose of streamlining the disclosure. This method of disclosure is not to be interpreted as reflecting an intention that the claimed embodiments require more features than are expressly recited in each claim. Rather, as the following claims reflect, inventive subject matter lies in less than all features of a single disclosed embodiment. Thus the following claims are hereby incorporated into the Detailed Description, with each claim standing on its own as a separate embodiment. In the appended claims, the terms "including" and "in which" are used as the plain-English equivalents of the respective terms "comprising" and "wherein," respectively. Moreover, the terms "first," "second," "third," and so forth, are used merely as labels, and are not intended to impose numerical requirements on their objects.

What has been described above includes examples of the disclosed architecture. It is, of course, not possible to describe every conceivable combination of components and/or methodologies, but one of ordinary skill in the art may recognize that many further combinations and permutations are possible. Accordingly, the novel architecture is intended to embrace all such alterations, modifications and variations that fall within the spirit and scope of the appended claims. The detailed disclosure now turns to providing examples that pertain to further embodiments. The examples provided below are not intended to be limiting.

Example 1

An apparatus to prioritize graphics processing unit (GPU) events comprising: logic, at least a portion of which is implemented in hardware, the logic to: receive an information element to include indications of a plurality of events executed by a graphics processing unit (GPU) comprising a plurality of architectural blocks, each of the plurality of events comprising a weight and a signature; determine, for each of the plurality of events, the signature based in part on at least one of the plurality of architectural blocks; and generate an event prioritization tree based on the plurality of events, the event prioritization tree comprising a plurality of leaf nodes and one or more parent nodes, each one of the leaf nodes corresponding to a respective one of the plurality of events, each of the one or more parent nodes comprising a cumulative weight based at least in part on the weight of the events associated with each leaf node descending from the parent node.

Example 2

The apparatus of example 1, the logic to receive an indication of at least one metric for each of the plurality of events.

Example 3

The apparatus of example 2, the at least one metric comprising one or more of a number of clock cycles to execute the event or a number of clock cycles between event changes.

Example 4

The apparatus of example 3, each of the plurality of events comprising a draw call, a clear call, a copy call, an update call, or a dispatch call.

Example 5

The apparatus of example 4, the logic to: identify a plurality of interfaces operably coupling the architectural blocks; determine, for each of the plurality of events, a performance indication for the plurality of interfaces; determine at least one architectural block limiting execution of the event based in part on the performance indication for the plurality of interfaces; and determine, for each of the plurality of events, the signature based on the determined architectural blocks.

Example 6

The apparatus of example 5, the performance indication comprising at least one of a number of clock cycles data is ready over the interface, a number of clock cycles data is refused over the interface, or a ratio of the number of clock cycles data is ready over a first interface over the number of clock cycles data is ready over a second interface, the second interface.

Example 7

The apparatus of example 1, each of the plurality of events corresponding to a one of a plurality of shaders, each parent node corresponding to a particular one of the plurality of shaders, wherein each leaf node of a particular parent node corresponds to the particular one of the plurality of shaders of the particular parent node.

Example 8

The apparatus of example 7, wherein the shaders comprise pixel shaders, vertex shaders, depth shaders, fragment shaders, domain shaders, hull shaders, computer shader, or geometry shaders.

Example 9

The apparatus of example 1, wherein the events comprise events for a single frame of a video to be rendered.

Example 10

The apparatus of example 1, wherein the plurality of events comprise events for a plurality of frames of a video to be rendered, each of the frames corresponding to at least one of the events.

Example 11

The apparatus of example 10, the logic to: determine a global weight of each frame based in part on a weight of ones of the events corresponding to the frame; and sort the frames based in part on the global weight.

Example 12

The apparatus of any one of examples 1 to 11, further comprising a display and a display interface operably coupled to the logic, the display interface to receive the event prioritization tree and to display an image to include indications of the event prioritization tree.

Example 13

A computing-implemented method comprising: receiving an information element to include an indication of a plurality of events of a graphics workload executed on a graphics processor, each of the plurality of events including an associated signature, weight, and one or more hashes; generating one or more parent nodes, each of the one or more parent nodes corresponding to a one of the one or more hashes; grouping the events into leaf nodes under at least one of the one or more parent nodes based on the one or more hashes; determining, for each parent node, a combined weight of the parent node based on the weight of each node below the parent node; and sorting the parent nodes based on combined weights.

Example 14

The computing-implemented method of example 13, comprising determining, for each of the events, the signature associated with the events.

Example 15

The computing-implemented method of example 14, comprising receiving an indication of at least one metric for each of the plurality of events.

Example 16

The computing-implemented method of example 15, the at least one metric comprising one or more of a number of clock cycles to execute the event or a number of clock cycles between event changes.

Example 17

The computing-implemented method of example 16, the plurality of events comprising a draw call, a clear call, a copy call, an update call, or a dispatch call.

Example 18

The computing-implemented method of example 17, comprising: identifying a plurality of interfaces operably coupling a plurality of architectural blocks; determining, for each of the plurality of events, a performance indication for the plurality of interfaces; determining at least one architectural block limiting execution of the event based in part on the performance indication for the plurality of interfaces; and determining, for each of the plurality of events, the signature based on the determined architectural blocks.

Example 19

The computing-implemented method of example 18, the performance indication comprising at least one of a number of clock cycles data is ready over the interface, a number of clock cycles data is refused over the interface, or a ratio of the number of clock cycles data is ready over a first interface over the number of clock cycles data is ready over a second interface, the second interface.

Example 20

The computing-implemented method of example 13, the one or more hashes correspond to one or more shaders.

Example 21

The computing-implemented method of example 20, the one or more shaders a pixel shader, a vertex shader, a depth shader, a fragment shader, or a geometry shader.

Example 22

The computing-implemented method of example 13, wherein the events comprise events for a single frame of a video to be rendered.

Example 23

The computing-implemented method of 13, wherein the events comprise events for a plurality of frames of a video to be rendered, each of the frames corresponding to at least one of the events.

Example 24

The computing-implemented method of example 23, comprising: determining a global weight of each frame based in part on a weight of ones of the events corresponding to the frame; and sorting the frames based in part on the global weight.

Example 25

An apparatus comprising means for performing the method of any of examples 13 to 24.

Example 26

At least one machine-readable storage medium comprising instructions that when executed by a computing device, cause the computing device to: receive an information element to include an indication of events of a graphics workload executed on a graphics processor, each of the events including an associated signature, weight, and one or more hashes; generate one or more parent nodes, each of the one or more parent nodes corresponding to a one of the one or more hashes; group the events into leaf nodes under at least one of the one or more parent nodes based on the one or more hashes; determine, for each parent node, a combined weight of the parent node based on the weight of each node below the parent node; and sort the parent nodes based on combined weights.

Example 27

The at least one machine-readable storage medium of example 26, comprising instructions that when executed by the computing device, cause the computing device to determine, for each of the events, the signature associated with the events.

Example 28

The at least one machine-readable storage medium of example 27, comprising instructions that when executed by the computing device, cause the computing device to receive an indication of at least one metric for each of the plurality of events.

Example 29

The computing-implemented method of example 28, the at least one metric comprising one or more of a number of clock cycles to execute the event or a number of clock cycles between event changes.

Example 30

The computing-implemented method of example 29, the at least one event comprising a draw call, a clear call, a copy call, an update call, or a dispatch call.

Example 31

The at least one machine-readable storage medium of example 30, comprising instructions that when executed by the computing device, cause the computing device to: identify a plurality of interfaces operably coupling the architectural blocks; determine, for each of the plurality of events, a performance indication for the plurality of interfaces; determine at least one architectural block limiting execution of the event based in part on the performance indication for the plurality of interfaces; and determine, for each of the plurality of events, the plurality of signatures based on the determined architectural blocks.

Example 32

The at least one machine-readable storage medium of example 31, the performance indication comprising at least one of a number of clock cycles data is ready over the interface, a number of clock cycles data is refused over the interface, or a ratio of the number of clock cycles data is ready over a first interface over the number of clock cycles data is ready over a second interface, the second interface.

Example 33

The at least one machine-readable storage medium of example 26, the one or more hashes correspond to one or more shaders.

Example 34

The at least one machine-readable storage medium of example 33, the one or more shaders at least one of a pixel shader, a vertex shader, a depth shader, a fragment shader, or a geometry shader.

Example 35

The at least one machine-readable storage medium of example 26, wherein the events comprise events for a single frame of a video to be rendered.

Example 36

The at least one machine-readable storage medium of example 26, wherein the events comprise events for a plurality of frames of a video to be rendered, each of the frames corresponding to at least one of the events.

Example 37

The at least one machine-readable storage medium of example 36, comprising instructions that when executed by the computing device, cause the computing device to: determine a global weight of each frame based in part on a weight of ones of the events corresponding to the frame; and sort the frames based in part on the global weight.

What is claimed is:

1. An apparatus to prioritize graphics processing unit (GPU) events comprising:
   logic, at least a portion of which is implemented in hardware, the logic to:
   receive an information element to include indications of a plurality of events executed by a graphics processing unit (GPU) comprising a plurality of architectural blocks, each of the plurality of events to comprise a weight and a signature, wherein a respective weight of a respective event of the plurality of events is based on a cycle count for the respective event;
   determine, for each of the plurality of events, the signature based in part on at least one of the plurality of architectural blocks; and
   generate an event prioritization tree based on the plurality of events, the event prioritization tree to comprise a plurality of leaf nodes and one or more parent nodes, each one of the leaf nodes to correspond to a respective one of the plurality of events, each of the one or more parent nodes to comprise a cumulative weight based at least in part on the weight of the events associated with each leaf node descending from the parent node, an event of the plurality of events to correspond to one or more shaders, a leaf node of the plurality of leaf nodes to correspond to the event and to one of the one or more shaders, and a parent node of the one or more parent nodes to correspond to the leaf node and to one of the one or more shaders.

2. The apparatus of claim 1, the logic to receive an indication of at least one metric for each of the plurality of events.

3. The apparatus of claim 2, the at least one metric comprising one or more of a number of clock cycles to execute at least one of the plurality of events or a number of clock cycles between event changes.

4. The apparatus of claim 3, each of the plurality of events comprising a draw call, a clear call, a copy call, an update call, or a dispatch call.

5. The apparatus of claim 1, the logic to:
identify a plurality of interfaces of the architectural blocks, an architectural block to embody a use of a portion of hardware of the GPU, an interface of the architectural block to comprise a metric of the event related to the use and the signature of the event to identify the portion of the hardware;
determine, for each of the plurality of events, a performance indication for the plurality of interfaces;
determine at least one architectural block limiting execution of the event based in part on the performance indication for the plurality of interfaces; and
determine, for each of the plurality of events, the signature based on the determined architectural blocks.

6. The apparatus of claim 5, the performance indication comprising at least one of a number of clock cycles data is ready over the interface, a number of clock cycles data is refused over the interface, or a ratio of the number of clock cycles data is ready over a first interface over the number of clock cycles data is ready over a second interface, the second interface.

7. The apparatus of claim 1, each of the plurality of events corresponding to a one of a plurality of shaders, each parent node corresponding to a particular one of the plurality of shaders, wherein each leaf node of a particular parent node corresponds to the particular one of the plurality of shaders of the particular parent node.

8. The apparatus of claim 7, wherein the shaders comprise pixel shaders, vertex shaders, depth shaders, fragment shaders, domain shaders, hull shaders, computer shader, or geometry shaders.

9. The apparatus of claim 1, wherein at least one event of the plurality of events comprises an event for a single frame of a video to be rendered.

10. The apparatus of claim 1, wherein the plurality of events comprise events for a plurality of frames of a video to be rendered, each of the frames corresponding to at least one of the events.

11. The apparatus of claim 10, the logic to:
determine a global weight of each frame based in part on a weight of ones of the events corresponding to the frame; and
sort the frames based in part on the global weight.

12. The apparatus of claim 1, further comprising a display and a display interface operably coupled to the logic, the display interface to receive the event prioritization tree and to display an image to include indications of the event prioritization tree.

13. A method to prioritize graphics processing unit (GPU) events comprising:
receiving, via logic, at least a portion of which is implemented in hardware, an information element to include indications of a plurality of events executed by a graphics processing unit (GPU) comprising a plurality of architectural blocks, each of the plurality of events to comprise a weight and a signature, wherein a respective weight of a respective event of the plurality of events is based on a cycle count for the respective event;
determining, via the logic, for each of the plurality of events, the signature based in part on at least one of the plurality of architectural blocks; and
generating, via the logic, an event prioritization tree based on the plurality of events, the event prioritization tree to comprise a plurality of leaf nodes and one or more parent nodes, each one of the leaf nodes to correspond to a respective one of the plurality of events, each of the one or more parent nodes to comprise a cumulative weight based at least in part on the weight of the events associated with each leaf node descending from the parent node, an event of the plurality of events to correspond to one or more shaders, a leaf node of the plurality of leaf nodes to correspond to the event and to one of the one or more shaders, and a parent node of the one or more parent nodes to correspond to the leaf node and to one of the one or more shaders.

14. The method of claim 13, wherein receiving the information element comprises receiving an indication of at least one metric for each of the plurality of events.

15. The method of claim 14, the at least one metric comprising one or more of a number of clock cycles to execute at least one of the plurality of events or a number of clock cycles between event changes.

16. The method of claim 15, each of the plurality of events comprising a draw call, a clear call, a copy call, an update call, or a dispatch call.

17. The method of claim 13, further comprising:
identifying, via the logic, a plurality of interfaces of the architectural blocks, an architectural block to embody a use of a portion of hardware of the GPU, an interface of the architectural block to comprise a metric of the event related to the use; and the signature of the event to identify the portion of the hardware;
determining, via the logic, for each of the plurality of events, a performance indication for the plurality of interfaces;
determining, via the logic, at least one architectural block limiting execution of the event based in part on the performance indication for the plurality of interfaces; and
determining, via the logic, for each of the plurality of events, the signature based on the determined architectural blocks.

18. The method of claim 17, the performance indication comprising at least one of a number of clock cycles data is ready over the interface, a number of clock cycles data is refused over the interface, or a ratio of the number of clock cycles data is ready over a first interface over the number of clock cycles data is ready over a second interface, the second interface.

19. At least one non-transitory machine-readable storage medium comprising instructions to prioritize graphics processing unit (GPU) events, the instructions, when executed by a computing device, cause the computing device perform operations, the operations comprising:
receiving, via logic, at least a portion of logic being implemented in hardware, an information element to include indications of a plurality of events executed by a graphics processing unit (GPU) comprising a plurality of architectural blocks, each of the plurality of events to comprise a weight and a signature, wherein a respective weight of a respective event of the plurality of events is based on a cycle count for the respective event;

determining, via the logic, for each of the plurality of events, the signature based in part on at least one of the plurality of architectural blocks; and generating, via the logic, an event prioritization tree based on the plurality of events, the event prioritization tree to comprise a plurality of leaf nodes and one or more parent nodes, each one of the leaf nodes to correspond to a respective one of the plurality of events, each of the one or more parent nodes to comprise a cumulative weight based at least in part on the weight of the events associated with each leaf node descending from the parent node, an event of the plurality of events to correspond to one or more shaders, a leaf node of the plurality of leaf nodes to correspond to the event and to one of the one or more shaders, and a parent node of the one or more parent nodes to correspond to the leaf node and to one of the one or more shaders.

20. The at least one non-transitory machine-readable storage medium of claim 19, each of the plurality of events corresponding to a one of a plurality of the shaders, each parent node corresponding to a particular one of the plurality of shaders, wherein each leaf node of a particular parent node corresponds to the particular one of the plurality of shaders of the particular parent node.

21. The at least one non-transitory machine-readable storage medium of claim 19, wherein the shaders comprise pixel shaders, vertex shaders, depth shaders, fragment shaders, domain shaders, hull shaders, computer shader, or geometry shaders.

22. The at least one non-transitory machine-readable storage medium of claim 19, wherein the plurality of events comprise events for a plurality of frames of a video to be rendered, each of the frames corresponding to at least one of the events.

23. The at least one non-transitory machine-readable storage medium of claim 22, wherein the operations further comprise:
determining, via the logic, a global weight of each frame based in part on a weight of ones of the events corresponding to the frame; and
sorting, via the logic, the frames based in part on the global weight.

* * * * *